US012352951B2

(12) United States Patent
Jamali et al.

(10) Patent No.: US 12,352,951 B2
(45) Date of Patent: Jul. 8, 2025

(54) HYBRID VARIFOCAL DEVICE AND SYSTEM

(71) Applicant: META PLATFORMS TECHNOLOGIES, LLC, Menlo Park, CA (US)

(72) Inventors: Afsoon Jamali, Issaquah, WA (US); Spencer Allan Wells, Seattle, WA (US); Changwon Jang, Seattle, WA (US); Christopher Stipe, Woodinville, WA (US); Sandro Pintz, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 714 days.

(21) Appl. No.: 17/700,761

(22) Filed: Mar. 22, 2022

(65) Prior Publication Data
US 2023/0324672 A1  Oct. 12, 2023

(51) Int. Cl.
G02B 26/08 (2006.01)
G02B 5/30 (2006.01)
G02B 27/01 (2006.01)
G06F 3/01 (2006.01)
G06T 7/246 (2017.01)

(52) U.S. Cl.
CPC ....... *G02B 26/0808* (2013.01); *G02B 5/3025* (2013.01); *G02B 27/0172* (2013.01); *G06F 3/013* (2013.01); *G06T 7/246* (2017.01); *G02B 2027/0178* (2013.01)

(58) Field of Classification Search
CPC ............. G02B 26/0808; G02B 5/3025; G02B 27/0172; G02B 2027/0178; G02B 27/28; G02B 3/14; G06F 3/013; G06T 7/246
See application file for complete search history.

(56) References Cited

U.S. PATENT DOCUMENTS 10,379,419 B1  8/2019 Lu et al.
10,948,801 B1  3/2021 Lu et al.
(Continued)

FOREIGN PATENT DOCUMENTS

CN  113330350 A  8/2021
CN  113785233 A  12/2021
(Continued)

OTHER PUBLICATIONS

Robert E Steven et al., A review of adjustable lenses for head mounted displays, Sep. 12, 2017, Digital Optics Technology, SPIE vol. 10335, pp. 103350Q1-103350Q19.*
(Continued)

*Primary Examiner* — Pinping Sun
*Assistant Examiner* — Robert Tongxay Hackett
(74) *Attorney, Agent, or Firm* — Greenberg Traurig, LLP

(57) ABSTRACT

A device includes a first lens configured to provide a first optical power that is variable within a first optical power adjustment range at a first step resolution. The device also includes a second lens coupled with the first lens and including a deformable member that is deformable to vary an optical power of the second lens. The second lens is configured to provide a second optical power that is variable within a second optical power adjustment range at a second step resolution, the second step resolution being smaller than the first step resolution.

19 Claims, 20 Drawing Sheets

(56) References Cited

U.S. PATENT DOCUMENTS

| | | |
|---|---|---|
| 11,175,508 B2 | 11/2021 | Jamali et al. |
| 11,221,488 B1 * | 1/2022 | Kangas .................. G02F 1/294 |
| 2014/0022619 A1 * | 1/2014 | Woodgate .......... G02B 27/0093 |
| | | 359/240 |
| 2016/0124220 A1 | 5/2016 | Bueeler et al. |
| 2018/0284464 A1 * | 10/2018 | Lu ............................ G02F 1/29 |
| 2020/0033693 A1 | 1/2020 | Lu et al. |
| 2022/0026720 A1 | 1/2022 | Jamali et al. |

FOREIGN PATENT DOCUMENTS

| | | | | |
|---|---|---|---|---|
| WO | WO-2018028847 A1 * | 2/2018 | ............. | G02C 7/085 |
| WO | WO-2021030093 A1 * | 2/2021 | ......... | G02B 27/0101 |
| WO | WO-2022040401 A1 * | 2/2022 | ............... | F41G 1/14 |

OTHER PUBLICATIONS

International Preliminary Report on Patentability for International Application No. PCT/US2023/015867, mailed Oct. 3, 2024, 8 pages.
International Search Report and Written Opinion for International Application No. PCT/US2023/015867, mailed Jun. 23, 2023, 10 pages.
Stevens R.E., et al., "A Review of Adjustable Lenses for Head Mounted Displays," International Society for Optics and Photonics, Proceedings of SPIE, Digital Optical Technologies, Sep. 12, 2017, vol. 10335, 20 pages.

* cited by examiner

| Time | t1 | t1<t<t2 | t2 | t2<t<t3 | t3 | t3<t<t4 | t4 |
|---|---|---|---|---|---|---|---|
| Second lens assembly 203 | PBP lens 207 | -1 | -1 | -1 | -1 | -1 | -1→+1 | +1 |
| | Varifocal lens 209 | -1 | -1→0 | 0 | 0→+1 | +1 | +1→-1 | -1 |
| First lens assembly 201 | -2 | -2 | -2 | -2 | -2 | -2 | -2 |
| Overall optical power | -4 | -4→-3 | -3 | -3→-2 | -2 | -2 | -2 |

| Time | t4<t<t5 | t5 | t5<t<t6 | t6 |
|---|---|---|---|---|
| Second lens assembly 203 | PBP lens 207 | +1 | +1 | +1 | +1 |
| | Varifocal lens 209 | -1→0 | 0 | 0→+1 | +1 |
| First lens assembly 201 | -2 | -2 | -2 | -2 |
| Overall optical power | -2→-1 | -1 | -1→0 | 0 |

FIG. 2D

HYBRID VARIFOCAL DEVICE AND SYSTEM

TECHNICAL FIELD

The present disclosure relates generally to optical devices and, more specifically, to a hybrid varifocal device and a system.

BACKGROUND

An artificial reality system, such as a head-mounted display ("HMD") or heads-up display ("HUD") system, generally includes a near-eye display ("NED") system in the form of a headset or a pair of glasses, and configured to present content to a user via an electronic or optic display within, for example, about 10-20 mm in front of the eyes of a user. The NED system may display virtual objects or combine images of real objects with virtual objects, as in augmented reality ("AR"), virtual reality ("VR"), and/or mixed reality ("MR") applications. VR, AR, and MR head-mounted displays have wide applications in various fields, including engineering design, medical surgery practice, and video gaming. For example, a user wears a VR head-mounted display integrated with audio headphones while playing video games so that the user can have an interactive experience in an immersive virtual environment.

SUMMARY OF THE DISCLOSURE

Consistent with an aspect of the present disclosure, a device is provided. The device includes a first lens configured to provide a first optical power that is variable within a first optical power adjustment range at a first step resolution. The device also includes a second lens coupled with the first lens and including a deformable member that is deformable to vary an optical power of the second lens. The second lens is configured to provide a second optical power that is variable within a second optical power adjustment range at a second step resolution, the second step resolution being smaller than the first step resolution.

Other aspects of the present disclosure can be understood by those skilled in the art in beam of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIG. 2D illustrates two tables showing driving schemes and optical power adjustments of the varifocal device shown in FIGS. 2A-2C, in accordance with an embodiment of the present disclosure;

DETAILED DESCRIPTION

Figure 1A:
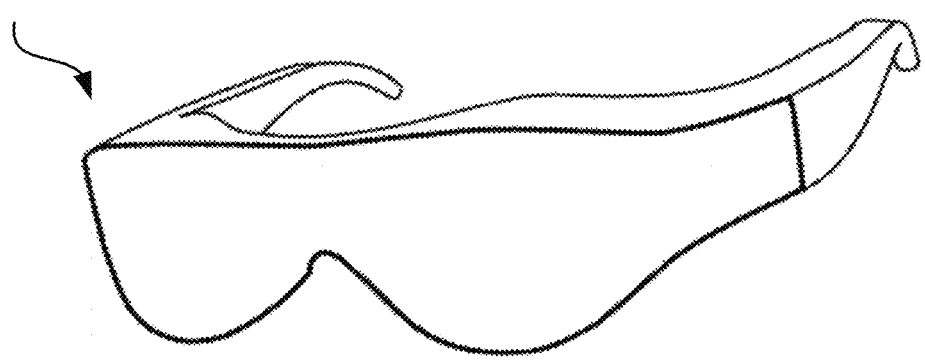
FIG. 1A illustrates a schematic diagram of a system, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a beam output from one optical element may be directly or indirectly received by the other optical element. An optical series refers to optical positioning of a plurality of optical elements in a beam path, such that a beam output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane.

The term "orthogonal" as in "orthogonal polarizations" or the term "orthogonally" as in "orthogonally polarized" means that an inner product of two vectors representing the two polarizations is substantially zero. For example, two beams or beams with orthogonal polarizations (or two orthogonally polarized beams or beams) may be two linearly polarized beams (or beams) with two orthogonal polarization directions (e.g., an x-axis direction and a y-axis direction in a Cartesian coordinate system) or two circularly polarized beams with opposite handednesses (e.g., a left-handed circularly polarized beam and a right-handed circularly polarized beam).

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a beam means that a major portion, including all, of a beam is transmitted, reflected, diffracted, or blocked, etc. The major portion may be a predetermined percentage (greater than 50%) of the entire beam, such as 100%, 98%, 90%, 85%, 80%, etc., which may be determined based on specific application needs.

The term "optic axis" may refer to a direction in a crystal. A beam propagating in the optic axis direction may not experience birefringence (or double refraction). An optic axis may be a direction rather than a single line: beams that are parallel to that direction may experience no birefringence.

Vergence-accommodation conflict is a problem in many artificial reality systems. Vergence is the simultaneous movement or rotation of both eyes in opposite directions to obtain or maintain single binocular vision, and is related to accommodation of the eyes. Under normal conditions, when human eyes look at a new object at a distance different from a previous object they have been looking at, the eyes automatically change focus (by changing their shapes) to provide accommodation at the new distance or vergence distance of the new object. In an artificial reality system, a display element may output an image light representing a virtual image, and a lens assembly may guide the image light to the eyes of the user. When viewing a virtual object displayed by the display element, the eyes rotate so that the views from (or the gaze lines of) the left and right eyes converge at a fixed distance in a space corresponding to the location of the virtual object. This distance is referred to as the vergence distance. However, because the display element is often positioned at a fixed distance from the eyes, the image light coming from all the virtual objects in the virtual image displayed by the display element may come from the same distance. That is, no matter whether the eyes are looking at a near virtual object or a far virtual object, the accommodation of the eyes (i.e., the deformation of the crystalline lens in the eyes) may not change. In other words, the accommodation distances of the near virtual object and the far virtual object may not change, which causes a conflict with the vergence distance. The vergence-accommodation conflict may become even worse when multiple virtual objects are displayed across a wide range of distances to the user from close to the user to far away from the user, and/or when the artificial reality system augments a relatively close real-world scene with the virtual objects. The vergence-accommodation conflict may significantly degrade the user experience.

The present discourse provides an optical system configured to reduce the vergence-accommodation conflict and enhance the viewing experience of the user. The optical system may include a varifocal device featured with compact size, light weight, reduced optical artifacts, improved image quality, fast switching, a continuous adjustment of optical power, a large optical power advancement range, etc. The disclosed varifocal device may be implemented in various devices or systems, e.g., head-up displays ("HUDs"), head-mounted displays ("HMDs"), near-eye displays ("NEDs"), smart phones, laptops, televisions, vehicles, etc., to enhance the user experience of virtual-reality ("VR"), augmented reality ("AR"), and/or mixed reality ("MR").

FIG. 1A illustrates a schematic diagram of an artificial reality system 100, according to an embodiment of the present disclosure. The system 100 may be an optical system configured for AR, MR, and/or VR applications, e.g., the system 100 may be implemented into HUDs, HMDs, NEDs, smart phones, laptops, televisions, vehicles, etc. In some embodiments, the system 100 may be configured to be worn on a head of a user (e.g., by having the form of spectacles or eyeglasses, as shown in FIG. 1A) or to be included as part of a helmet that is worn by the user. In some embodiments, the system 100 may be configured for placement in proximity of an eye or eyes of the user at a fixed location in front of the eye(s), without being mounted to the head of the user. For example, the system 100 may be mounted in a vehicle, such as a car or an airplane, at a location in front of an eye or eyes of the user.

Figure 1B:
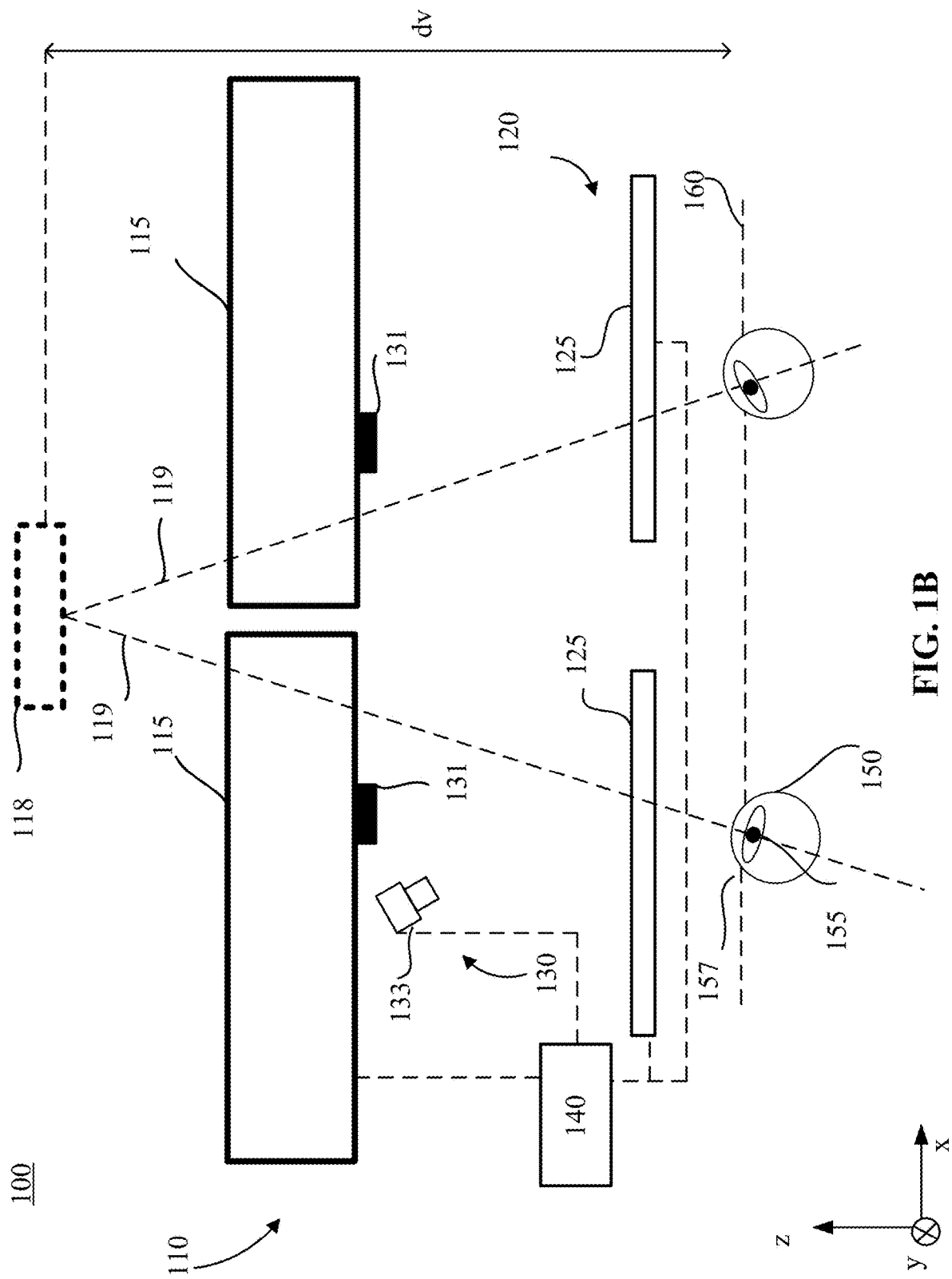
FIG. 1B illustrates a schematic cross-sectional view of the system shown in FIG. 1A, according to an embodiment of the present disclosure.

FIG. 1B schematically illustrates an x-y sectional view of the system 100 shown in FIG. 1A, according to an embodiment of the present disclosure. The system 100 may include a display assembly 110, a viewing optics assembly 120, an object tracking system 130, and a controller 140. The controller 140 may be communicatively coupled with the display assembly 110, the viewing optics assembly 120, and/or the object tracking system 130 to control the operations thereof. The controller 140 may include a processor or processing unit. The processor may by any suitable processor, such as a central processing unit ("CPU"), a graphic processing unit ("GPU"), etc. The controller 140 may include a storage device. The storage device may be a non-transitory computer-readable medium, such as a memory, a hard disk, etc. The storage device may be configured to store data or information, including computer-executable program instructions or codes, which may be executed by the processor to perform various controls or functions described in the methods or processes disclosed herein.

The object tracking system 130 may be an eye tracking system and/or face tracking system. The object tracking system 130 may include an IR light source 131 configured to emit an IR light to illuminate the eyes 150 and/or the face. The object tracking system 130 may also include an optical sensor 133, such as a camera, configured to receive the IR light reflected by each eye 150 and generate a tracking signal relating to the eye 150, such as an image of the eye 150. In some embodiments, the object tracking system 130 may also include an IR deflecting element (not shown) configured to deflect the IR light reflected by the eye 150 toward the optical sensor 133.

The display assembly 110 may display virtual images. In some embodiments, the display assembly 110 may include a single electronic display or multiple electronic displays 115. For discussion purposes, FIG. 1B shows two electronic displays 115 for left and right eyes 150 of the user, respectively. The electronic display 115 may include a display panel (also referred to as 115 for discussion purposes), such as a liquid crystal display ("LCD") panel, a liquid-crystal-on-silicon ("LCoS") display panel, an organic light-emitting diode ("OLED") display panel, a micro light-emitting diode ("micro-LED") display panel, a digital light processing ("DLP") display panel, a laser scanning display panel, or a combination thereof. In some embodiments, the display panel 115 may be a self-emissive panel, such as an OLED display panel or a micro-LED display panel. In some embodiments, the display panel 115 may be a display panel that is illuminated by an external source, such as an LCD panel, an LCOS display panel, or a DLP display panel. Examples of an external source may include a laser, an LED, an OLED, or a combination thereof.

The viewing optics assembly 120 may be arranged between the display assembly 110 and the eyes 150, and may be configured to guide an image light representing a virtual image output from the display assembly 110 to one or more exit pupils 157 in an eye-box region 160. The exit pupil 157 is a spatial location within the eye-box region 160, where an eye pupil 155 of the eye 150 may be positioned to receive the image light. Thus, the eye 150 located at the exit pupil 157 may perceive the virtual image generated by the display assembly 110. In some embodiments, the exit pupils 157 may be arranged in a one-dimensional ("1D") or a two-dimensional ("2D") array within the eye-box region 160. The size of a single exit pupil 157 may be larger than and comparable with the size of the eye pupil 155. The exit pupils 157 may be sufficiently spaced apart, such that when one of the exit pupils 157 substantially coincides with the position of the eye pupil 155, the remaining one or more exit pupils 157 may be located outside of the eye pupil 155.

The viewing optics assembly 120 may include a varifocal device 125 configured to guide an image light output from the display assembly 110 to an eye-box region 159. For discussion purpose, FIG. 1B shows that the viewing optics assembly 120 may include two varifocal devices 125 for the left and right eyes 150, respectively. In some embodiments, each of the varifocal devices 125 (also referred to as "the varifocal device 125" for convenience of discussion) may be configured to transform an image light (e.g., a divergent image light) emitted from each point on the electronic display 115 to a collimated image light that substantially covers one or more exit pupils 157 in the eye-box region 159. The varifocal device 125 may be configured with an adjustable optical power to address an accommodation-vergence conflict in the system 100. For example, the varifocal device 125 may be configured with a large aperture size (such as 50 mm) for a large field of view (such as 65 degrees with 20 mm eye relief distance), a large and continuous adjustment range of optical power for adapting human eye vergence accommodation, a fast switching speed at the milli-seconds level or tens of milliseconds level for adapting vergence-accommodation of human eyes, and a high image quality for meeting human eye acuity. For example, each electronic display 115 may display a virtual image or a portion of the virtual image. Based on the eye tracking information provided by the eye tracking assembly 130, the controller 140 may determine a virtual object 118 within the virtual image at which the eyes 150 are currently looking. The controller 140 may determine a vergence depth (dv) of the gaze of the user based on the gaze point or an estimated intersection of gaze lines 119 determined by the object tracking system 130. As shown in FIG. 1B, the gaze lines 119 may converge or intersect at the distance dv, where the virtual object 118 is located. The controller 140 may control the varifocal devices 125 to adjust the optical power to provide an accommodation that matches the vergence depth (dv) associated with the virtual object 118 at which the eyes 150 are currently looking, thereby reducing the accommodation-vergence conflict in the system 100. For example, the controller 140 may control the varifocal device 125 to operate in a desirable operation state to provide a desirable optical power corresponding to a focal plane or an image plane that matches with the vergence depth (dv).

In some embodiments, the varifocal device 125 may also be configured to correct aberrations in the image light output from the electronic display 115 while transforming the image light. In some embodiments, based on the eye tracking information from the object tracking system 130, the controller 140 may control the electronic display 115 and/or the varifocal device 125 to steer and focus the image light to the exit pupil 157 that substantially coincides with the position of the eye pupil 155.

Figure 2A:
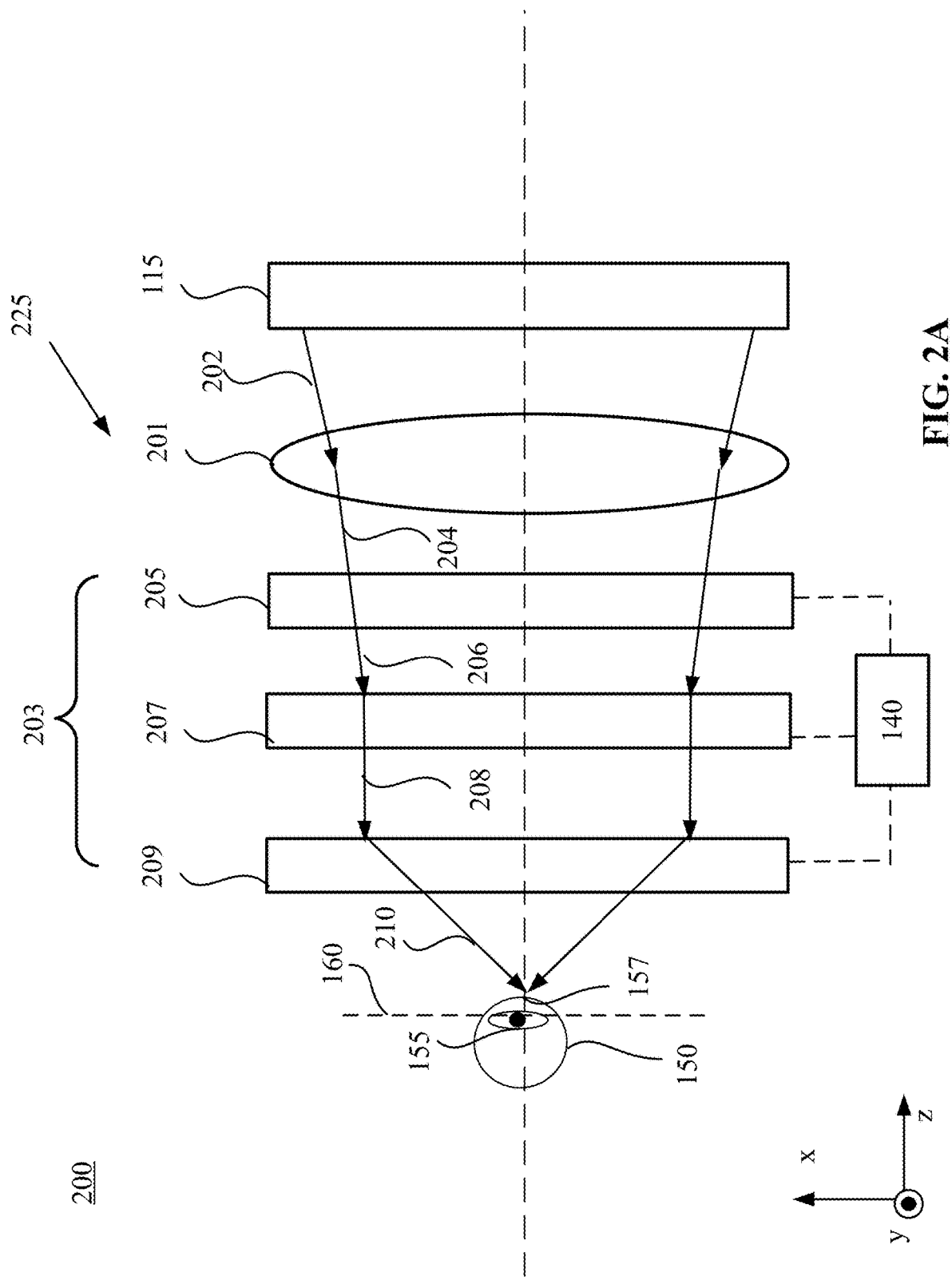
FIG. 2A schematically illustrates a diagram of a system including a varifocal device, according to an embodiment of the present disclosure.

FIG. 2A schematically illustrates a diagram of a system 200, according to an embodiment of the present disclosure. As shown in FIG. 2A, the system 200 may include the electronic display 115 and a varifocal device 225. The varifocal device 225 may be disposed between the electronic display 115 and the eye-box region 160. The varifocal device 225 may be an embodiment of the varifocal device 125 shown in FIG. 1B. The varifocal device 225 may include a first lens assembly 201 and a second lens assembly 203 arranged in an optical series. In some embodiments, as shown in FIG. 2A, the first lens assembly 201 may be arranged between the electronic display 115 and the second lens assembly 203, and the second lens assembly 203 may be arranged between the eye-box region 160 and the first lens assembly 201. In some embodiments, the second lens assembly 203 may be arranged between the electronic display 115 and the first lens assembly 201, and the first lens assembly 201 may be arranged between the eye-box region 160 and the second lens assembly 203.

In some embodiments, the first lens assembly 201 may be configured with a fixed optical power for an image light 202 output from the electronic display 115. The optical power of the first lens assembly 201 may not be adjustable or variable via an external force. In some embodiments, the first lens assembly 201 may be configured with a variable optical power for the image light 202. The first lens assembly 201 may be configured to transform (e.g., converge or focus) the image light 202 output from the electronic display 115 into an image light 204 propagating toward the second lens assembly 203. For discussion purposes, FIG. 2A shows a single ray of the image light 202 output from a point at the upper half of the electronic display 115.

In some embodiments, the first lens assembly 201 may include one or more solid lenses (e.g., glass lenses, or polymer lenses), one or more liquid crystal lenses (e.g., gradient refractive index lenses), one or more hologram-based lenses, or a combination thereof, etc. In some embodiments, the distance between the one or more solid lenses (e.g., glass lenses, or polymer lenses) may be adjustable via a suitable mechanism, such as a motor. In some embodiments, the first lens assembly 201 may include a Fresnel lens (or Fresnel lens arrays), or a folded (or path-folding) lens assembly, etc. The Fresnel lens may provide apertures and focal lengths comparable to conventional lenses, with a smaller thickness and a lighter weight. The folded lens assembly may be configured to fold an optical path of the image light 202 from the electronic display 115 to the eye 150, thereby increasing the length of the optical path of the image light 202 from the electronic display 115 to the exit pupil 157 without increasing the physical distance between the electronic display 115 and the eye-box region 160. The folded lens assembly may increase a field of view ("FOV") of the system 200 without increasing the physical distance between the electronic display 115 and the eye 150 or without compromising the image quality. Examples of the folded lens assembly include a pancake lens assembly, a double pancake lens assembly, a lens assembly including one or more reflective holographic elements, etc.

In some embodiments, the second lens assembly 203 may be configured to provide a variable optical power for the image light 204 output from the first lens assembly 201 (or the image light 202 output from the electronic display 115). In some embodiments, the second lens assembly 203 may include a polarization switch 205, a Pancharatnam Berry Phase ("PBP") lens 207, and a tunable lens 209 arranged in an optical series. In some embodiments, as shown in FIG. 2A, the PBP lens 207 may be disposed between the tunable lens 209 and the polarization switch 205, and the polarization switch 205 may be disposed between the PBP lens 207 and the first lens assembly 201.

In the embodiment shown in FIG. 2A, the polarization switch 205, the PBP lens 207, and the tunable lens 209 are shown as being spaced apart from one another by a gap. In some embodiments, the polarization switch 205, the PBP lens 207, and the tunable lens 209 may be stacked without a gap (e.g., through direct contact). FIG. 2A shows the polarization switch 205, the PBP lens 207, and the tunable lens 209 included in the second lens assembly 203 have flat surfaces for illustrative purposes. In some embodiments, one or more of the polarization switch 205, the PBP lens 207, and the tunable lens 209 may have a curved surface.

The polarization switch 205 may be optically coupled with the PBP lens 207, and may transmit the image light 204 output from the first lens assembly 201 as an image light (e.g., a circularly polarized image light) 206 toward the PBP lens 207. The polarization switch 205 may be configured to control the handedness of the image light 206 incident onto the PBP lens 207. The controller 140 (not shown) may be communicatively coupled with the polarization switch 205 to control the operation state of the polarization switch 205. In some embodiment, the controller 140 may control the polarization switch 205 to switch between operating in a first operation state and a second operation state. The polarization switch 205 operating in the first operation state may transmit the image light 204 as the image light 206 having a first handedness. The polarization switch 205 operating in the second operation state may transmit the image light 204 as the image light 206 having a second handedness that is opposite to the first handedness.

In some embodiment, the image light 204 (shown in FIG. 2A) output from the first lens assembly 201 may be a circularly polarized image light, and the polarization switch 205 may include a switchable half-wave plate. The polarization switch 205 may output the image light (e.g., circular polarized image light) 206 having the first handedness or the second handedness. In some embodiments, the switchable half-wave plate may be a suitable liquid crystal ("LC") based switchable half-wave plate that includes one or more LC cells, e.g., a Pi cell, a ferroelectric cell, an electronically controlled birefringence ("ECB") cell, a dual ECB cell, or a combination thereof. The switchable half-wave plate may be switchable between operating in a switching state and operating in a non-switching state. The switchable half-wave plate operating in the switching state may change a handedness of a circularly polarized light to an orthogonal handedness while transmitting the circularly polarized light. The switchable half-wave plate operating in the non-switching state may maintain the polarization of the circularly polarized light while transmitting the circularly polarized light.

In some embodiment, the image light 204 output from the first lens assembly 201 may be a linearly polarized image light, and the polarization switch 205 may include the switchable half-wave plate and a quarter-wave plate. The polarization switch 205 may output the image light (e.g., circular polarized image light) 206 having the first handedness or the second handedness. In some embodiments, the quarter-wave plate may be disposed between the switchable half-wave plate and the first lens assembly 201, and may be configured to convert the image light (e.g., linearly polarized image light) 204 into a circularly polarized image light (not shown) propagating toward the switchable half-wave plate. The switchable half-wave plate operating in the switching state may change a handedness of the circularly polarized light to an orthogonal handedness while transmitting the circularly polarized light. The switchable half-wave plate operating in the non-switching state may maintain the polarization of the circularly polarized light while transmitting the circularly polarized light. In some embodiments, the quarter-wave plate may be disposed between the switchable half-wave plate and the PBP lens 207, and may be configured to convert a linearly polarized image light output from the switchable half-wave plate into a circularly polarized image light propagating toward the PBP lens 207. The switchable half-wave plate operating in the switching state may change a polarization of a linearly polarized light to an orthogonal polarization while transmitting the polarized light. The switchable half-wave plate operating in the non-switching state may maintain the polarization of the linearly polarized light while transmitting the polarized light.

In some embodiment, the image light 204 output from the first lens assembly 201 may be a linearly polarized image light, and the polarization switch 205 may include a twisted nematic liquid crystal ("TNLC") cell and a quarter-wave plate (not shown). The polarization switch 205 may output the image light (e.g., circular polarized image light) 206 having the first handedness or the second handedness. The quarter-wave plate may be disposed between the TNLC cell and the PBP lens 207. The TNLC cell may be switchable between operating in a switching state and operating in a non-switching state. The TNLC cell operating in the switching state may change a polarization of a linearly polarized light to an orthogonal polarization while transmitting the linearly polarized light. The TNLC cell operating in the non-switching state may maintain the polarization of the linearly polarized light while transmitting the linearly polarized light. The quarter-wave plate may be configured to convert a linearly polarized image light output from the TNLC cell into a circularly polarized image light toward the PBP lens 207.

The PBP lens 207 may modulate a circularly polarized input light having a wavelength within the operation wavelength of the PBP lens 207, based on a lens phase profile provided through the geometric phase. The lens phase profile is a spatial distribution of the phase change along at least one dimension of the PBP lens 207, which may be applied to the input light by the PBP lens 207. The PBP lens 207 may include a birefringent film, and the lens phase profile may be encoded into an in-plane orientation pattern of an optic axis of the birefringent film. The PBP lens 207 may be polarization selective, and may operate in a plurality of optical states to provide a plurality of discrete optical powers. For example, the PBP lens 207 may operate in a focusing state (or converging state) for a circularly polarized input light having a predetermined handedness, and provide a first predetermined positive optical power (e.g., +M Diopter, where M is a suitable positive number). The PBP lens 207 may operate in a defocusing state (or diverging state) for a circularly polarized input light having a handedness that is opposite to the predetermined handedness, and provide a first predetermined negative optical power (e.g., −M Diopter). In some embodiments, the PBP lens 207 may operate in a neutral state to provide a zero optical power (e.g., 0 Diopter), independent of the handedness of the circularly polarized input light.

In the disclosed embodiments, the PBP lens 207 may be configured to provide a first optical power that is variable within a first optical power adjustment range at a first step resolution (unit: Diopter). The first optical power and the first step resolution may be determined, in part, by the parameters, the material, and the configuration of the PBP lens 207. In some embodiments, the PBP lens 207 may be a passive PBP lens with the operation state switchable between the focusing state and the defocusing state, when the handedness of the input light is reversed by the polarization switch 205 optically coupled with the PBP lens 207, as the polarization switch 205 is controlled by the controller 140. Accordingly, the optical power of the PBP lens 207 may be switchable among two discrete optical powers, e.g., the first predetermined positive optical power (e.g., +M Diopter(s)) and the first predetermined negative optical power (e.g., −M Diopter(s)). Thus, the first optical power may vary between +M Diopter(s) and −M Diopter(s) with the first step resolution of 2*M Diopters. For example, when M=1, the first optical power adjustment range may be from +1 Diopter to −1 Diopter, and the first optical power may vary between +1 Diopter and −1 Diopter at the first step resolution of 2 Diopters.

In some embodiments, the PBP lens 207 may be an active PBP lens that is switchable among the focusing state, the defocusing state, and the neutral state, via controlling the polarization switch 205 optically coupled with the PBP lens 207 and a power source electrically coupled with the PBP lens 207. When the voltage supply from the power source is off or less than a first predetermined threshold voltage, the PBP lens 207 may be switchable between the focusing state and the defocusing state, when the handedness of the input light is reversed by the polarization switch 205 optically coupled with the PBP lens 207, as the polarization switch 205 is controlled by the controller 140. When the voltage supply from the power source is on and greater than a predetermined second threshold voltage, the PBP lens 207 may operate at the neutral state. Accordingly, the optical power of the PBP lens 207 may be switchable among three discrete optical powers, e.g., the first predetermined positive optical power (e.g., +M Diopter(s)), the first predetermined negative optical power (e.g., −M Diopter(s)), and the zero optical power (e.g., 0 Diopter). Thus, the first optical power may vary between +M Diopter(s) and −M Diopter(s) with the first step resolution of M Diopter(s). For example, when M=1, the first optical power adjustment range may be from +1 Diopter to −1 Diopter, and the first optical power may vary between +1 Diopter and −1 Diopter at the first step resolution of 1 Diopter.

In the embodiment shown in FIG. 2A, the PBP lens 207 may focus or defocus the image light 206 as an image light 208 propagating toward the tunable lens 209. The tunable lens 209 may transform (e.g., focus or defocus) the image light 208 into an image light 210 propagating toward the eye-box region 160. The tunable lens 209 may be configured with at least one adaptive, morphable (e.g., deformable) member (e.g., an optical interface) that can change its shape through a suitable mechanism. The deformable member may form a lens shape, or have a lens surface profile. When the shape of the deformable member is changed, the optical power of the tunable lens 209 may be changed accordingly. In some embodiments, the deformable member may have a refractive index that is different from the refractive index of an outside environment (e.g., air). In some embodiments, two media disposed at the opposite sides of the deformable member may have different refractive indices. In some embodiments, the deformable member may have a uniform thickness across an aperture of the deformable member. In some embodiments, the deformable member may have a varying thickness across an aperture of the deformable member. For example, in some embodiments, the thickness of the deformable member may decrease or increase from a center region to a periphery region of the deformable member, along a radial direction. In some embodiments, the tunable lens 209 may be polarization non-selective (or polarization independent). For example, the tunable lens 209 may provide the same optical power to input lights having different polarizations. In some embodiments, the tunable lens 209 may be polarization selective (or polarization dependent). For example, the tunable lens 209 may provide different optical powers to input lights having different polarizations. The tunable lens 209 may not include liquid crystals ("LCs"), e.g., the tunable lens 209 may be a non-LC lens.

Figure 2B:
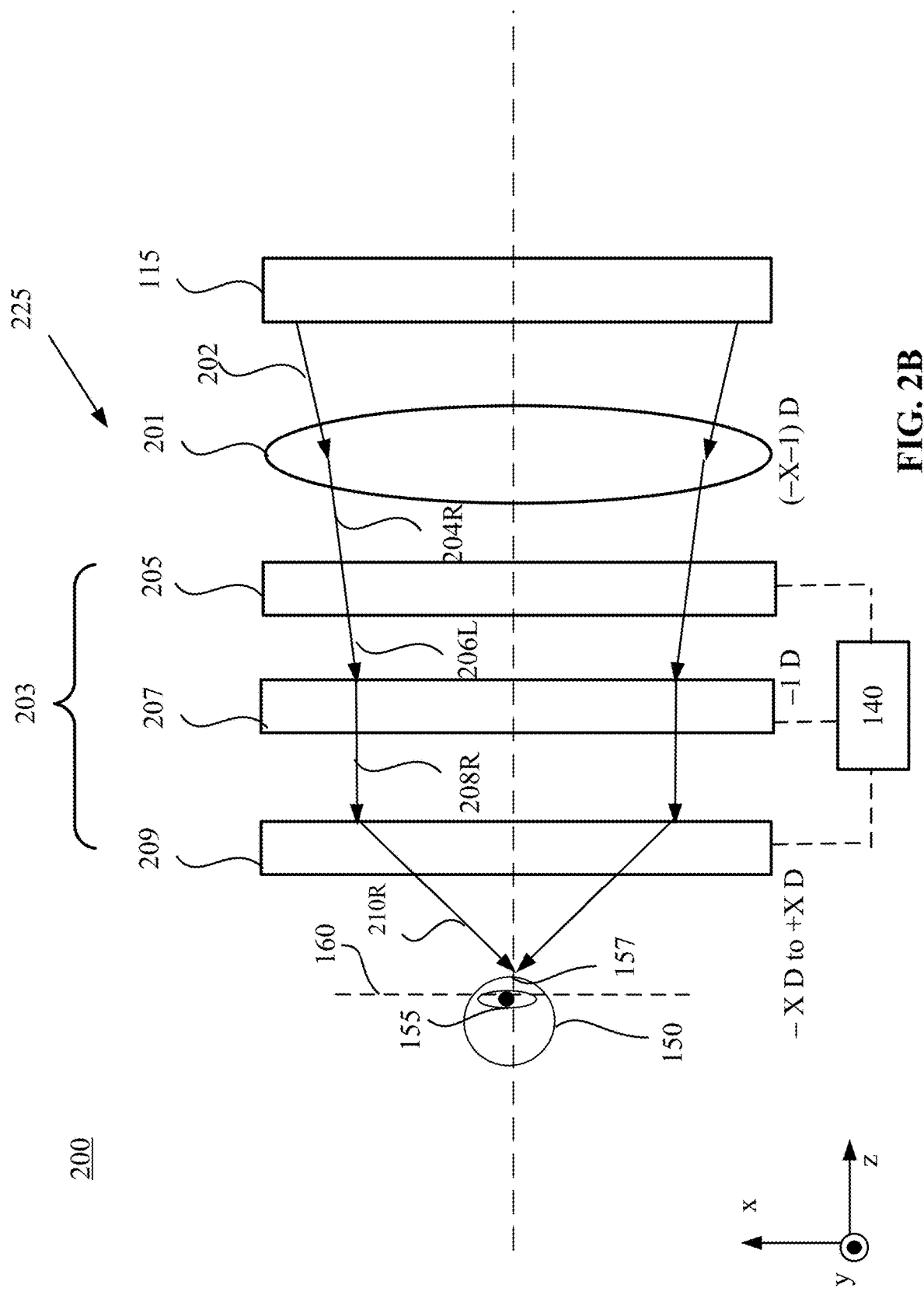
FIGS. 2B and 2C illustrate diagrams of the varifocal device shown in FIG. 1A configured to provide different optical powers, according to an embodiment of the present disclosure.
Figure 2C:
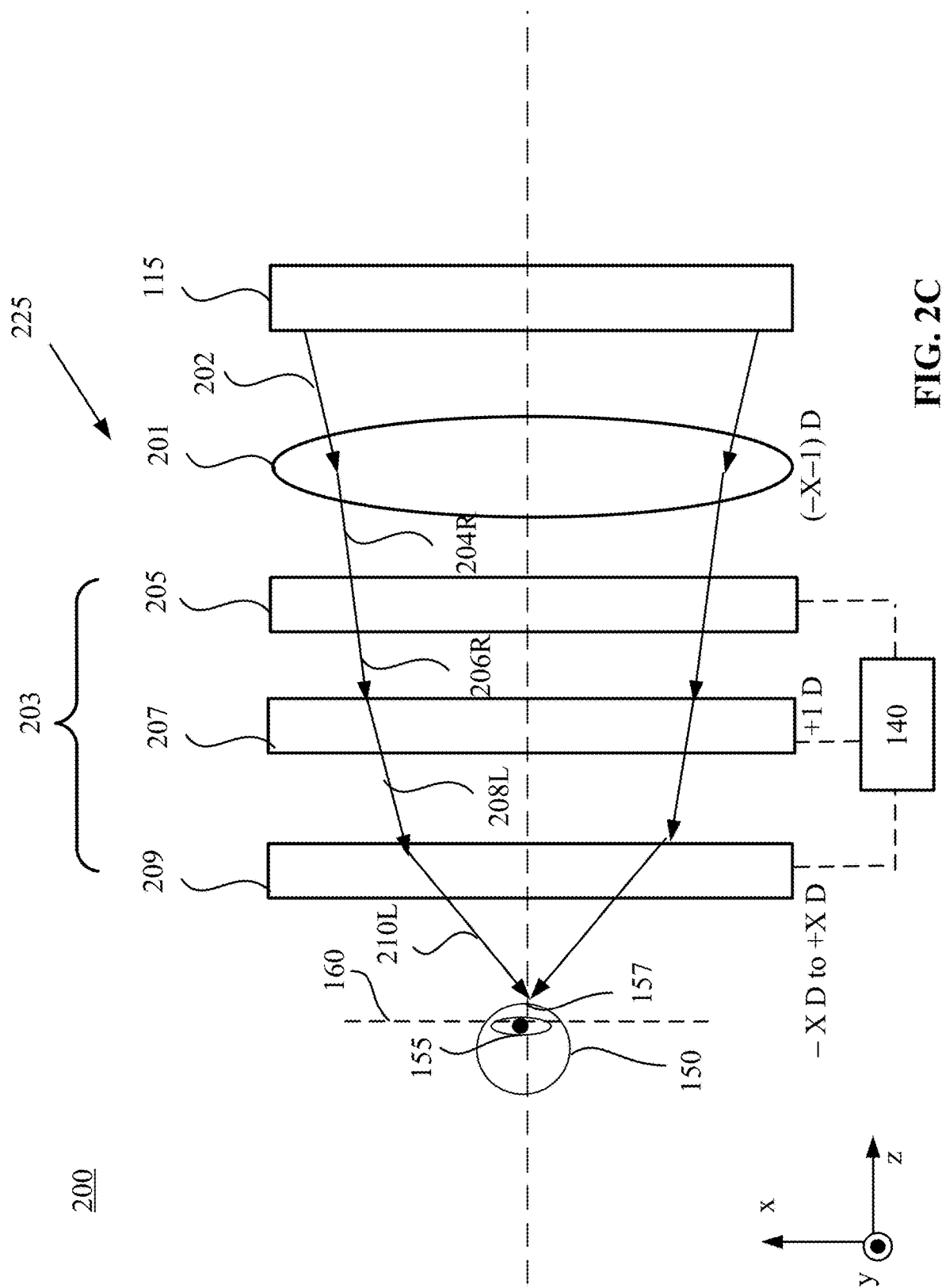
Figure 2E:
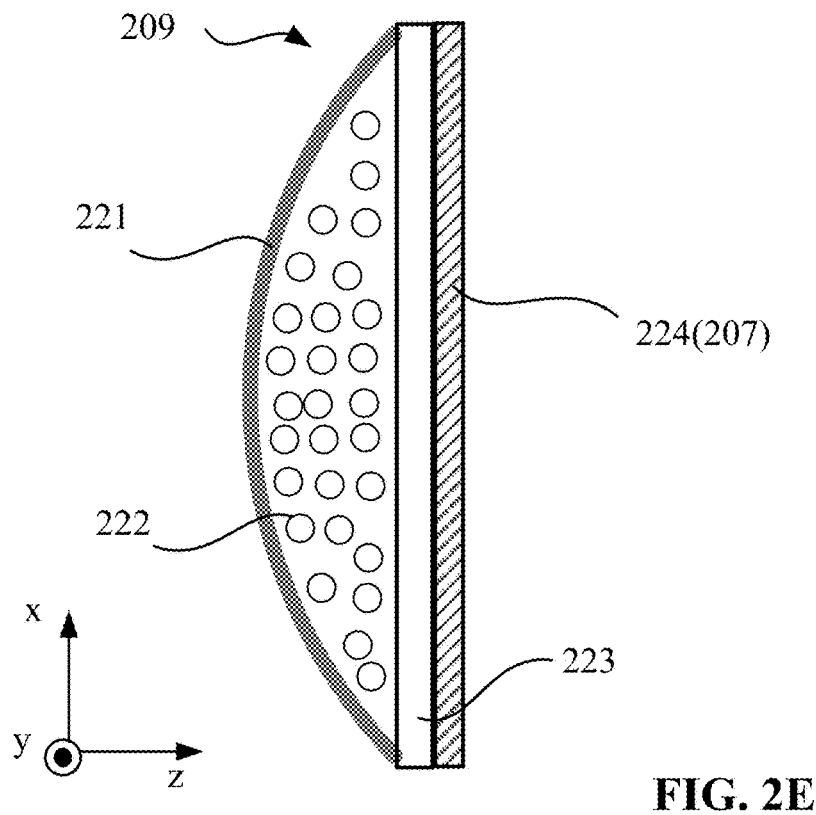
FIGS. 2E-2G schematically illustrate diagrams of the varifocal device shown in FIG. 2A, according to various embodiments of the present disclosure.
Figure 2F:
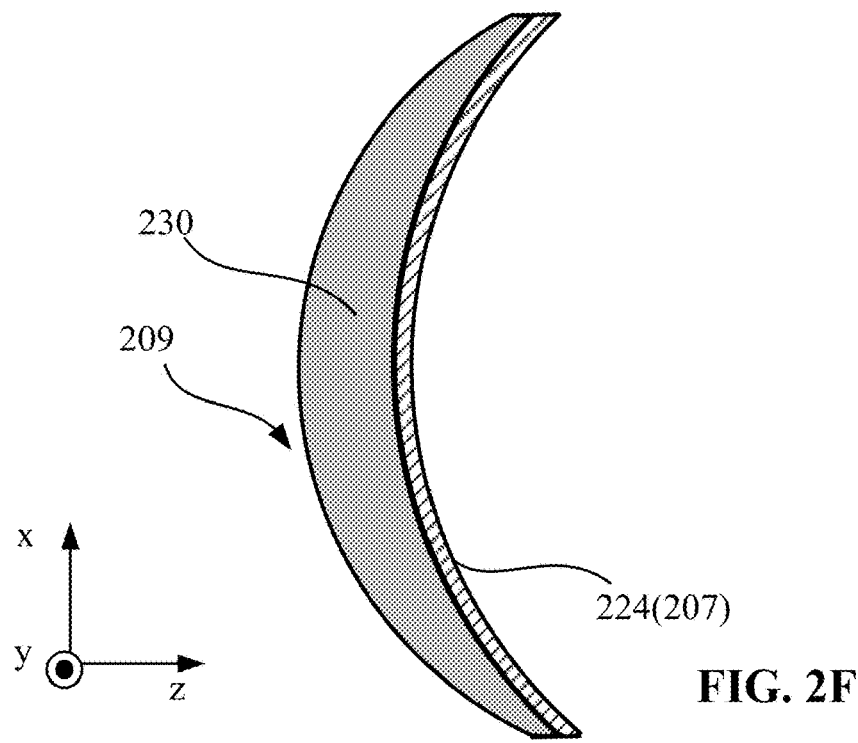
Figure 2G:
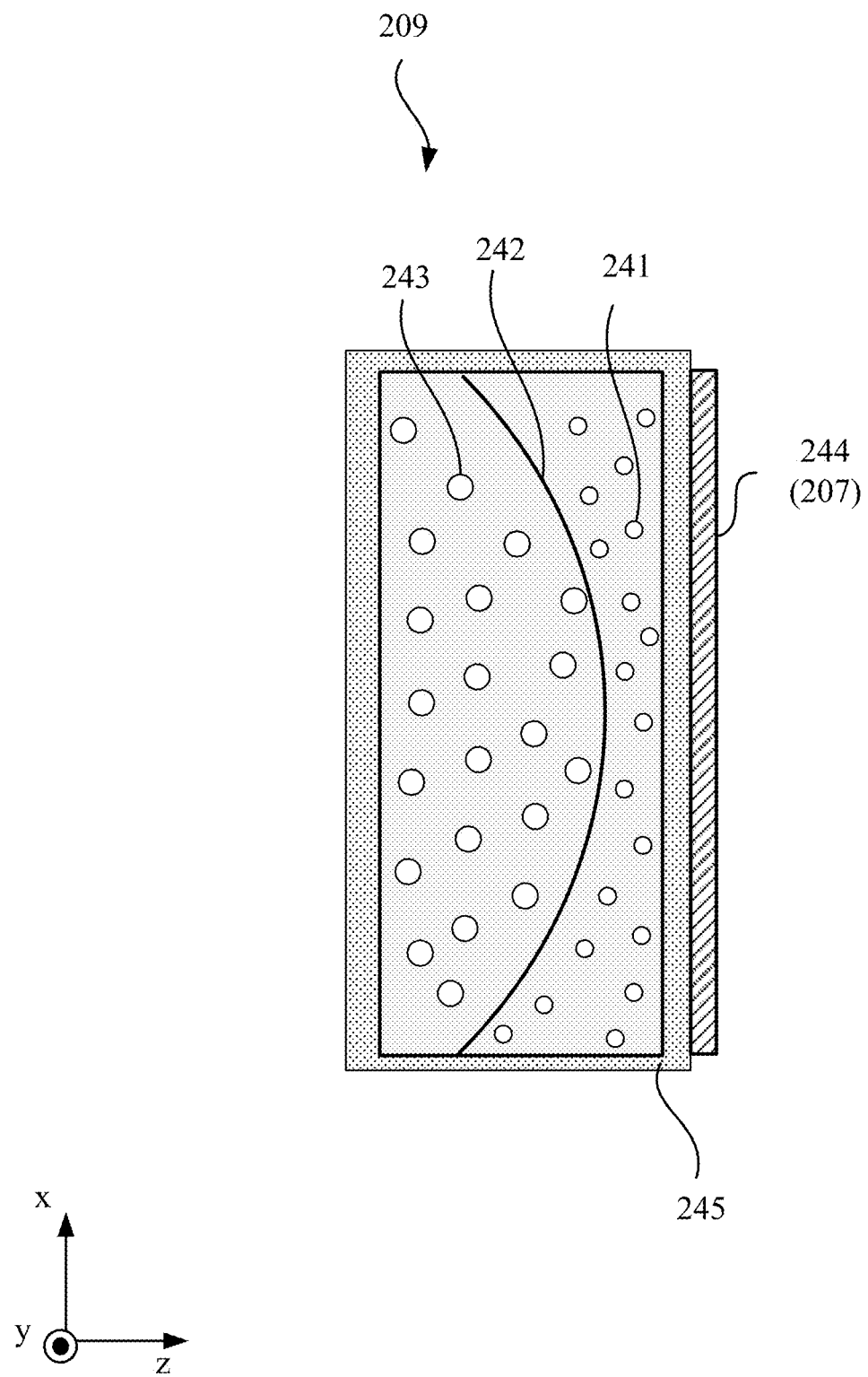

FIGS. 2E-2G illustrate various configurations or structures of the tunable lens 209 for illustrative purposes. In some embodiments, the tunable lens 209 may have other configurations. FIG. 2E schematically illustrates an x-z sectional view of the tunable lens 209, according to an embodiment of the present disclosure. As shown in FIG. 2E, the tunable lens 209 may include an optical fluid 222 (schematically represented by the circles) encapsulated within a chamber formed by a deformable member 221 and a substrate 223. The deformable member 221 may be an elastic membrane having a spherical shape (shown as an arc shape in the cross-sectional view of FIG. 2E), which may be changed when the elastic membrane deforms. The optical fluid 222 may have a refractive index greater than the refractive index of the outside environment (e.g., air). The deformable member 221, the optical fluid 222, and the substrate 223 may be optically transparent. The optical effect of the deformable member 221 may be negligible. A physical interface between the optical fluid 222 and the outside environment (e.g., air) may be deemed as a deformable optical interface of the tunable lens 209. The tunable lens 209 may be driven by a suitable actuator to change the shape of the deformable member 221, thereby changing the shape of the deformable optical interface. As a result, the optical power of the tunable lens 209 may be varied.

The tunable lens 209 shown in FIG. 2E may be referred to as a membrane liquid lens, or a liquid-filled lens that may be driven by various actuators, e.g., a mechanical actuator, a piezoelectric (or "piezo") actuator, or a voice coil actuator, etc. The membrane liquid lens or the liquid-filled lens may be a mechanical varifocal liquid lens, an edge actuator liquid lens, or an edge driven membrane liquid lens, etc. In some embodiments, the actuator may drive (e.g., press or pull) the deformable member 221 directly to change the shape of the deformable member 221, and hence the optical power of the tunable lens 209. In some embodiments, the actuator may drive (e.g., move, press, or pull) a supporting member mechanically coupled with the deformable member 221, thereby causing the shape of the deformable member 221 to change. In some embodiments, the deformable member 221 may be a piezo member that may change the shape when applied with a voltage.

In some embodiments, for example, as shown in FIG. 2E, the PBP lens 207 may be stacked with the tunable lens 209. The PBP lens 207 may include a birefringent film 224, in which the lens phase profile may be encoded into an in-plane orientation pattern of an optic axis of the birefringent film 224. The PBP lens 207 and the tunable lens 209 may share the substrate 223. That is, the optical fluid 222 and the birefringent film 224 of the PBP lens 207 may be disposed at opposite surfaces of the substrate 223. The birefringent film 224 of the PBP lens 207 may be disposed at a surface of the substrate 223, as shown in FIG. 2E. In some embodiments, although not shown, the birefringent film 224 may replace the substrate 223, and the optical fluid 222 may be encapsulated within a chamber formed by the birefringent film 224 and the deformable member 221. When the birefringent film 224 replaces the substrate 223, the optical fluid 222 may be in direct contact with the birefringent film 224. The birefringent film 224 may function as the mechanical support for the optical fluid 222 of the tunable lens 209. In some embodiments, although not shown, the birefringent film 224 may be disposed at and in contact with (e.g., laminated at) a surface of the deformable member 221 (which may be a deformable membrane). For example, the birefringent film 224 of the PBP lens 207 may be laminated at an outer surface of the deformable member 221. Because the deformable member 221 is curved, when the birefringent film 224 of the PBP lens 207 is laminated at the outer surface of the deformable member 221, the PBP lens 207 is bent to conform to the curved shape of the deformable member 221. The shape of the birefringent film 224 may change with the shape of the deformable member 221. In some embodiments, when the shape of the birefringent film 224 of the PBP lens 207 changes, the in-plane pitch of the PBP lens 207 may change. Accordingly, the optical power of the PBP lens 207 may change. For example, when the in-plane pitch of the PBP lens 207 decreases, the optical power of the PBP lens 207 may increase. In some embodiments, although not shown, the birefringent film 224 may replace the deformable member 221, and the optical fluid 222 may be encapsulated within a chamber formed by the birefringent film 224 and the substrate 223.

FIG. 2F schematically illustrates an x-z sectional view of the tunable lens 209, according to another embodiment of the present disclosure. As shown in FIG. 2F, in this embodiment, the tunable lens 209 may include a deformable member 230 that may change its shape when driven by a suitable driving mechanism. For example, when the deformable member 230 or a supporting member mechanically coupled with the deformable member 230 is driven by an actuator, e.g., a mechanical actuator, a piezo actuator, or a voice coil actuator, etc., the shape of the deformable member 230 may change. The tunable lens 209 may not include an optical fluid. The deformable member 230 may be a solid, optically transparent member (e.g., a membrane). In some embodiments, the deformable member 230 may include a piezo membrane that is optically transparent and is deformable by, e.g., applying a voltage (and hence the tunable lens 209 may be a piezo membrane lens). In some embodiments, the piezo membrane may be configured with a curvature at a non-activating state, e.g., a voltage-off state. The curvature at the non-activating state may be referred to as a pre-curvature. Thus, the tunable lens (e.g., piezo membrane lens) 209 may have a pre-curvature, i.e., the tunable lens 209 may be curved, as shown in FIG. 2F. As the applied voltage changes, the shape of the piezo membrane may change accordingly, which in turn changes the optical power of the piezo membrane.

In some embodiments, as shown in FIG. 2F, the birefringent film 244 of the PBP lens 207 may be disposed (e.g., laminated) at the deformable member 230 (either surface of the deformable member 230). Thus, the shape of the birefringent film 244 of the PBP lens 207 (and hence the shape of the PBP lens 207) may change along with the shape of the deformable member 230. In some embodiments, when the shape of the birefringent film 224 of the PBP lens 207 changes, the in-plane pitch of the PBP lens 207 may change. Accordingly, the optical power of the PBP lens 207 may change. For example, when the in-plane pitch of the PBP lens 207 decreases, the optical power of the PBP lens 207 may increase.

FIG. 2G schematically illustrates an x-z sectional view of the tunable lens 209, according to another embodiment of the present disclosure. As shown in FIG. 2G, the tunable lens 209 may include a housing 245 defining a chamber, in which two optical fluids 241 and 243 are encapsulated. The two optical fluids 241 and 243 may be immersible, optically transparent, and may be configured with different refractive indices. A liquid-liquid interface 242 may form between the two optical fluids 241 and 243. In some embodiments, the optical fluids 241 and 243 may also be configured with substantially the same density. The tunable lens 209 may also include electrodes for applying a voltage to the optical fluids 241 and 243 to change the shape of the liquid-liquid interface 242 between the optical fluids 241 and 243 via a suitable mechanism, e.g., electrowetting, or dielectrophoretic, etc. The liquid-liquid interface 242 may function as the deformable member or deformable optical interface of the tunable lens 209. For example, in some embodiments, the tunable lens 209 shown in FIG. 2G may be an electrowetting lens or a dielectrics liquid lens that may be driven by a voltage. In some embodiments, the body (or volume) of the optical fluid 241 or the body (or volume) of the optical fluid 243 may also be deemed as a deformable member. In some embodiments, when driven by a voltage, the shape of the liquid-liquid interface 242 may change, thereby changing the optical power of the tunable lens 209.

In some embodiments, a deformable member (e.g., a membrane) (not shown in FIG. 2G) may be disposed between the two bodies of the optical fluids 241 and 243 to separate the optical fluids 241 and 243. The deformable member may function as the deformable optical interface for the tunable lens 209. The deformable membrane may be optically transparent, and may be deformed by various driving mechanisms. For example, the deformable membrane or a supporting member mechanically coupled with the deformable membrane may be driven by an actuator, e.g., a mechanical actuator, a piezo actuator, or a voice coil actuator, etc., to change the shape of the deformable membrane, thereby causing the shape of the deformable member of the tunable lens 209 to change its shape. Accordingly, the optical power of the tunable lens 209 may be varied.

In some embodiments, as shown in FIG. 2G, the birefringent film 244 of the PBP lens 207 may be disposed (e.g., laminated) at the chamber 245 (either surface of the chamber 245). The chamber 245 may function as a substrate at which the birefringent film 244 is disposed, and provide a mechanical support to the birefringent film 244.

Referring back to FIG. 2A, in some embodiments, materials forming the tunable lens 209 may be optically isotropic, and the tunable lens 209 may be polarization non-selective or polarization independent. In some embodiments, the tunable lens 209 may be configured to provide a second optical power that is variable within a second optical power adjustment range at a second step resolution (unit: Diopter).

The second step resolution may be determined, in part, by a minimum driving force that is needed to change the optical power of the tunable lens 209. For example, when the tunable lens 209 is driven by a voltage, the second step resolution may be determined, in part, by a minimum voltage change that is needed to change the optical power of the tunable lens 209. When the tunable lens 209 is driven by a mechanical force, the second step resolution may be determined, in part, by a minimum mechanical force change that is needed to change the optical power of the tunable lens 209.

In some embodiments, the second step resolution provided by the tunable lens 209 may be configured to be substantially small, such that the optical power change may not be perceivable or noticeable by human eyes. The optical power of the tunable lens 209 may be variable between zero (e.g., 0 Diopter) and a predetermined positive value (e.g., +N Diopter(s), where N is a suitable positive value) at the second step resolution, between zero (e.g., 0 Diopter) and a predetermined negative optical power (e.g., −N Diopter(s)) at the second step resolution, or between a predetermined positive optical power (e.g., +N/2 Diopter(s)) and a predetermined negative optical power (e.g., −N/2 Diopter(s)) at the second step resolution.

An overall optical power provided by the second lens assembly 203 including the polarization switch 205, the PBP lens 207, and the tunable lens 209 may be a sum of the respective optical powers of the PBP lens 207 and the tunable lens 209. An overall optical power adjustment of the second lens assembly 203 may range from an overall minimum optical power that is a sum of the respective minimum optical powers of the PBP lens 207 and the tunable lens 209, to an overall maximum optical power that is a sum of the respective maximum optical powers of the PBP lens 207 and the tunable lens 209.

The PBP lens 207 may be switched to provide discrete optical powers in the first step resolution. When the first step resolution is relatively large (e.g., equal to or greater than 0.5 Diopter), an image distortion may be perceived by human eyes located at the exit pupil 160, when the PBP lens 207 is switched to provide the discrete optical powers. Hence the user experience may be degraded. When the first step resolution is substantially small (e.g., equal to or less than 0.05 Diopter), the image distortion may be substantially small and may not be perceived by the human eyes located at the exit pupil 160, when the PBP lens 207 is switched to provide the discrete optical powers. However, to adapt for human eye vergence-accommodation (e.g., ~±2 Diopters or more) in an artificial reality system, a greater number of PBP lenses having a small step resolution (e.g., 0.05 Diopter) may be needed than the PBP lenses having a large step resolution (e.g., equal to or greater than 0.5 Diopter). As the number of PBP lenses increases, the size, weight, haze, chromatic aberration, and ghost images of the system may be increased, the overall transmission of the system may be reduced, and the image quality may be significantly reduced.

The tunable lens 209 may result in an image distortion when the optical power of the tunable lens 209 increases, due to a reduction of the peripheral uniformity of the optical interface of the tunable lens 209. In some embodiments, to ensure that the tunable lens 209 has a substantially spherical profile or substantially spherical optical interface, an absolute value of the maximum or minimum optical power of the tunable lens 209 may be configured to be equal to or less than a predetermined value, e.g., 1.0 Diopter.

In the disclosed embodiments, the first step resolution of the PBP lens 207 may be configured to be equal to or greater than 0.5 Diopter and less than or equal to 1.0 Diopter, and the second step resolution of the tunable lens 209 may be configured to be less than the first step resolution of the PBP lens 207. In some embodiments, the second step resolution of the tunable lens 209 may be configured to be smaller than or equal to $1/10$ (or $1/20$, $1/15$, $1/5$, or any other suitable fraction) of the first step resolution of the PBP lens 207. For example, the first step resolution may be greater than or equal to 0.5 Diopter, 0.6 Diopter, 0.7 Diopter, 0.8 Diopter, 0.9 Diopter, or 1.0 Diopter, etc., and the second step resolution may be less than or equal to 0.05 Diopter, 0.06 Diopter, 0.07 Diopter, 0.08 Diopter, 0.09 Diopter, or 0.1 Diopter, etc. In other words, the tunable lens 209 may be configured to provide a finer adjustment of the optical power in the second step resolution, and the PBP lens 207 may be configured to provide a rougher or more coarse adjustment of the optical power in the first step resolution. In some embodiments, the second optical power adjustment range (or a difference between a minimum optical power and a maximum optical power) of the tunable lens 209 may be configured to be greater than or equal to the first step resolution of the PBP lens 207.

In some embodiments, the second step resolution for adjusting the optical power of the tunable lens 209 may be sufficiently small (e.g., less than or equal to 0.05 Diopter), such that the fine tuning of the optical power may be deemed as a continuous adjustment of the optical power. In some embodiment, the first step resolution for adjusting the optical power of the PBP lens 207 may be sufficiently large (e.g., larger than or equal to 1.0 Diopter), such that the rough tuning of the optical power may be deemed as a discrete adjustment of the optical power. During the operation of the second lens assembly 203, the PBP lens 207 may be configured to operate in a plurality of discrete optical states to provide a discrete adjustment of the optical power, and the tunable lens 209 may be configured to operate in a plurality of continuous optical states to provide a continuous adjustment of the optical power. Here, the terms "continuous adjustment" and "discrete adjustment" are relative terms. When the second step resolution is substantially less than the first step resolution (e.g., less than a predetermined threshold), for example, being less than or equal $1/20$, $1/15$, $1/10$, or $1/5$, (or any other suitable fraction) of the first step resolution, the optical power adjustment at the second step resolution may be deemed as a continuous or fine adjustment, whereas the optical power adjustment at the first step resolution may be deemed as a discrete or coarse adjustment.

During the operation of the PBP lens 207 and the tunable lens 209, when the PBP lens 207 is controlled to change from providing a first discrete optical power to providing a second discrete optical power in the first step resolution, the tunable lens 209 may be controlled to change from providing a third optical power to providing a fourth optical power in the second step resolution in a continuous manner. A difference between the third optical power and the fourth optical power may be configured to be equal to or greater than the first step resolution.

The second lens assembly 203 including the PBP lens 207 and the tunable lens 209 may be referred to as a hybrid lens assembly, and the varifocal device 225 may be referred to as a hybrid varifocal device. Through configuring the step resolutions and driving schemes of the tunable lens 209 and the PBP lens 207, the second lens assembly 203 may be configured to provide a wide optical power adjustment range in a continuous manner at the second step resolution without reducing the image quality. Accordingly, the varifocal device 225 may be configured to provide a wide optical power adjustment range in a continuous manner at the second step resolution without reducing the image quality.

FIGS. 2B and 2C illustrate that the varifocal device 225 provides different optical powers. In FIGS. 2B and 2C, for discussion purposes, the image light 202 output from the display element 115 may be a circularly polarized light, the first lens assembly 201 may provide a fixed optical power of (−X−1) Diopters to the image light 202. For discussion purposes, the image light 204 output from the first lens assembly 201 may be an RHCP light. The PBP lens 207 may provide an optical power of +1 Diopter to an RHCP light, and provide an optical power of −1 Diopter to an LHCP light. The tunable lens 209 may provide the same optical power to an RHCP light and an LHCP light, and the optical power of the tunable lens 209 may be variable from −X Diopters to +X Diopters in the second step resolution. In FIGS. 2B and 2C, "R" represents an RHCP light, and "L" represents an LHCP light.

For discussion purposes, FIG. 2B shows that the polarization switch 205 operates in the switching state to transmit the RHCP image light 204R as an LHCP image light 206L. Thus, the PBP lens 207 may provide an optical power of −1 Diopter to the LHCP image light 206L, and transmit the LHCP image light 206L as an RHCP image light 208R. The tunable lens 209 may provide an optical power that is variable from −X Diopters to +X Diopters in the second step resolution to the RHCP image light 208R. The tunable lens 209 may convert the RHCP image light 208R to an RHCP image light 210R propagating toward the eye-box region 160. Thus, for the image light 202 output from the display element 115, when the polarization switch 205 operates in the switching state, the second lens assembly 203 may provide an overall optical power that is variable from (−X−1) Diopters to (X−1) Diopters, and the varifocal device 225 may provide an overall optical power that is variable from (−2*X−2) Diopters to −2 Diopters. For example, when the optical power of the tunable lens 209 is controlled to be −X Diopters, the overall optical power of the second lens assembly 203 may be (−X−1) Diopters, and the overall optical power of the varifocal device 225 may be (−2*X−2) Diopters. When the optical power of the second lens assembly 203 is controlled to be +X Diopters, the overall optical power of the second lens assembly 203 may be (X−1) Diopters, and the overall optical power of the varifocal device 225 may be −2 Diopters.

When the optical power of the tunable lens 209 is controlled to vary from −X Diopters to +X Diopters in the second step resolution, the overall optical power of the second lens assembly 203 may vary from (−X−1) Diopters to (X−1) Diopters in the second step resolution. Accordingly, the overall optical power of the varifocal device 225 may vary from (−2*X−2) Diopters to −2 Diopters in the second step resolution. When X=1, the overall optical power of the second lens assembly 203 may be varied continuously between −2 Diopters and 0 Diopter in the second step resolution, and the overall optical power of the varifocal device 225 may be varied continuously between −4 Diopters and −2 Diopters in the second step resolution.

For discussion purposes, FIG. 2C shows that the polarization switch 205 operates in the non-switching state to transmit the RHCP image light 204R as an RHCP image light 206R. Thus, the PBP lens 207 may provide an optical power of +1 Diopter to the RHCP image light 206R, and transmit the RHCP image light 206R as an LHCP image light 208L. The tunable lens 209 may provide an optical power that is variable from −X Diopters to +X Diopters in the second step resolution to the LHCP image light 208L.

The tunable lens 209 may convert the LHCP image light 208L into an LHCP image light 210L and may focus the image light 210L toward the eye-box region 160.

Thus, for the image light 202 output from the display element 115, when the polarization switch 205 operates in the non-switching state, the second lens assembly 203 may provide an overall optical power that is variable from (−X+1) Diopters to (X+1) Diopters, and the varifocal device 225 may provide an overall optical power that is variable from (−2*X) Diopters to 0 Diopter. For example, when the optical power of the tunable lens 209 is controlled to be −X Diopters, the overall optical power of the second lens assembly 203 may be (−X+1) Diopters, and the overall optical power of the varifocal device 225 may be (−2*X) Diopters. When the optical power of the second lens assembly 203 is controlled to be +X Diopters, the overall optical power of the second lens assembly 203 may be (X+1) Diopters, and the overall optical power of the varifocal device 225 may be 0 Diopter.

When the optical power of the tunable lens 209 is controlled to vary from −X Diopters to +X Diopters in the second step resolution, the overall optical power of the second lens assembly 203 may vary from (−X+1) Diopters to (X+1) Diopter in the second step resolution. Accordingly, the overall optical power of the varifocal device 225 may vary from (−2*X) Diopters to 0 Diopter in the second step resolution. When X=1, the overall optical power of the second lens assembly 203 may continuously vary between 0 Diopters and 2 Diopters in the second step resolution, and the overall optical power of the varifocal device 225 may continuously vary between −2 Diopters and 0 Diopter in the second step resolution.

FIG. 2D shows two tables (which may also be regarded as two pieces of a continuous table) showing example driving schemes and optical power adjustments of the varifocal device 225, in accordance with an embodiment of the present disclosure. For discussion purposes, the first optical power of the PBP lens 207 varies between +1 Diopter and −1 Diopter at the first step resolution of 2 Diopters, and the second optical power of the tunable lens 209 varies between +1 Diopter and −1 Diopter at the first step resolution of 0.02 Diopter. The second optical power adjustment range of the tunable lens 209 is equal to the first step resolution of the PBP lens 207. The first lens assembly 201 provides an overall fixed optical power of −2 Diopters.

Referring to FIG. 2B and FIG. 2D, during an operation of the varifocal device 225, at a time instance t1, the polarization switch 205 operates in the switching state, the PBP lens 207 provides an optical power of −1 Diopter, and the tunable lens (or varifocal lens) 209 provides an optical power of −1 Diopter. Thus, the second lens assembly 203 provides an overall optical power of −2 Diopters. The varifocal device 225 provides an overall optical power of −4 Diopters.

From the time instance t1 to a time instance t2, the polarization switch 205 operates in the switching state, the PBP lens 207 constantly provides the optical power of −1 Diopter, and the tunable lens 209 is controlled to change from providing an optical power of −1 Diopter to providing an optical power of 0 Diopter in the second step resolution (e.g., 0.02 Diopter). Thus, an overall optical power of the second lens assembly 203 changes from −2 Diopters to −1 Diopter in the second step resolution, and an overall optical power of the varifocal device 225 changes from −4 Diopters to −3 Diopters in the second step resolution.

At the time instance t2, the polarization switch 205 operates in the switching state, the PBP lens 207 provides an optical power of −1 Diopter, and the tunable lens 209 provides an optical power of 0 Diopter. Thus, the second lens assembly 203 provides an overall optical power of −1 Diopter, and the varifocal device 225 provides an overall optical power of −3 Diopters.

From the time instance t2 to a time instance t3, the polarization switch 205 operates in the switching state, the PBP lens 207 constantly provides the optical power of −1 Diopter, and the tunable lens 209 is controlled to change from providing an optical power of 0 Diopter to providing an optical power of +1 Diopter in the second step resolution (e.g., 0.02 Diopter). Thus, an overall optical power of the second lens assembly 203 changes from −1 Diopter to 0 Diopter in the second step resolution, and an overall optical power of the varifocal device 225 changes from −3 Diopters to −2 Diopters in the second step resolution.

At the time instance t3, the polarization switch 205 operates in the switching state, the PBP lens 207 may provide an optical power of −1 Diopter, and the tunable lens 209 may provide an optical power of +1 Diopter. Thus, the second lens assembly 203 may provide an overall optical power of 0 Diopter, and the varifocal device 225 may provide an overall optical power of −2 Diopters.

Referring to FIG. 2C and FIG. 2D, from the time instance t3 to a time instance t4, the polarization switch 205 is controlled to change from operating in the switching state to operating in the non-switching state, and the tunable lens 209 is controlled to change from providing an optical power of +1 Diopter to providing an optical power of −1 Diopter in the second step resolution (e.g., 0.02 Diopter). The duration from the time instance t3 to the time instance t4 may be determined by the switching speed of the polarization switch 205 and the switching speed of the tunable lens 209. The duration from the time instance t3 to the time instance t4 may be configured to be substantially short, e.g., at a level of several microseconds, at a level of several hundreds of milliseconds, at a level of several tens of milliseconds, or at a level of several milliseconds, etc.

At a time instance t4, the PBP lens 207 provides an optical power of +1 Diopter, and the tunable lens 209 provides an optical power of −1 Diopter. Thus, the second lens assembly 203 may still provide an overall optical power of 0 Diopter that is the same as the optical power provided at the instance point t3, and the varifocal device 225 may still provide an overall optical power of −2 Diopters that is the same as the optical power provided at the time instance t3. As the duration from the time instance t3 to the time instance t4 is substantially short, and the optical power of the tunable lens 209 is varied along with the optical power of the PBP lens 207 to render the second lens assembly 203 to have overall optical power of 0 Diopter from the time instance t3 to the time instance t4, the optical power change from the time instance t3 to the time instance t4 may not be perceivable by the eye of the user.

From the time instance t4 to a time instance t5, the polarization switch 205 operates in the non-switching state, the PBP lens 207 constantly provides the optical power of +1 Diopter, and the tunable lens 209 is controlled to change from providing an optical power of −1 Diopter to providing an optical power of 0 Diopter in the second step resolution. Thus, an overall optical power of the second lens assembly 203 changes from 0 Diopter to +1 Diopter in the second step resolution, and an overall optical power of the varifocal device 225 changes from −2 Diopters to −1 Diopter in the second step resolution.

At the time instance t5, the polarization switch 205 operates in the non-switching state, the PBP lens 207 provides an optical power of +1 Diopter, and the tunable lens 209 provides an optical power of 0 Diopter. Thus, the second lens assembly 203 provides an overall optical power of +1 Diopter, and the varifocal device 225 provides an overall optical power of −1 Diopter.

From the time instance t5 to a time instance t6, the polarization switch 205 operates in the non-switching state, the PBP lens 207 constantly provides the optical power of +1 Diopter, and the tunable lens 209 is controlled to change from providing an optical power of 0 Diopter to providing an optical power of +1 Diopter in the second step resolution. Thus, an overall optical power of the second lens assembly 203 changes from +1 Diopter to +2 Diopters in the second step resolution, and an overall optical power of the varifocal device 225 changes from −1 Diopter to 0 Diopter in the second step resolution.

At the time instance t6, the polarization switch 205 operates in the non-switching state, the PBP lens 207 provides an optical power of +1 Diopter, and the tunable lens 209 provides an optical power of +1 Diopter. Thus, the second lens assembly 203 provides an overall optical power of +2 Diopters, and the varifocal device 225 provides an overall optical power of 0 Diopter.

Referring to FIGS. 2B-2D, through switching the operation state of the polarization switch 205 and adjusting the optical power of the tunable lens 209 in the second step resolution, the overall optical power of the second lens assembly 203 may continuously vary between −2 Diopters and +2 Diopters (when X=1) in the second step resolution and, accordingly, the overall optical power of the varifocal device 225 may continuously vary between −4 Diopters and 0 Diopter (when X=1) in the second step resolution.

Compared to the optical power adjustment range of the tunable lens 209 (e.g., from −1 Diopter to +1 Diopter), the second lens assembly 203 may be configured to provide an enlarged optical power adjustment range (e.g., from −2 Diopters to +2 Diopters). Thus, the second lens assembly 203 may have an improved capability of mitigating the vergence accommodation conflict. Accordingly, the varifocal device 225 may have an improved capability of mitigating the vergence accommodation conflict. In addition, compared to the first step resolution provided by the PBP lens 207, the second lens assembly 203 may be configured to provide a reduced or finer step resolution for the optical power adjustment, i.e., the second step resolution (e.g., less than or equal to 0.05 Diopter, 0.06 Diopter, 0.07 Diopter, 0.08 Diopter, 0.09 Diopter, or 0.1 Diopter, etc.), which is smaller than the first step resolution (e.g., greater than or equal to 0.5 Diopter, 0.6 Diopter, 0.7 Diopter, 0.8 Diopter, 0.9 Diopter, or 1.0 Diopter, etc.). Thus, the image quality may be improved when the optical power of the second lens assembly 203 is continuously adjusted between −4 Diopters to 0 Diopter in the finer second step resolution (when X=1). Accordingly, the overall image quality of the varifocal device 225 may be improved.

For discussion purposes, FIG. 2A shows that the PBP lens 207 is disposed between the tunable lens 209 and the polarization switch 205, and the polarization switch 205 is disposed between the PBP lens 207 and the first lens assembly 201. In some embodiments, for example, as shown in FIG. 2I, a system 280 may include the electronic display 15 and a varifocal device 285 that includes the first lens assembly 201 and a second lens assembly 283. In the second lens assembly 283, the polarization switch 205 may be disposed between the PBP lens 207 and the tunable lens 209, and the tunable lens 209 may be disposed between the polarization switch 205 and the first lens assembly 201. In some embodiments, although not shown, the tunable lens

209 may be disposed between the PBP lens 207 and the polarization switch 205, and the polarization switch 205 may be disposed between the tunable lens 209 and the first lens assembly 201.

In some embodiments, the second lens assembly 203 may include additional elements that are not shown in FIG. 2A. In some embodiments, for example, as shown in FIG. 2J, a system 290 may include the electronic display 115 and a varifocal device 295 that includes the first lens assembly 201 and a second lens assembly 293. For discussion purposes, in the second lens assembly 293, the tunable lens 209, the PBP lens 207, and the polarization switch 205 may be referred to as a first stack, and the polarization switch 205 may be referred to as a first polarization switch. The tunable lens 209, the PBP lens 207, and the polarization switch 205 may be arranged in a suitable order disclosed herein in the first stack. The second lens assembly 293 may also include a second stack of an absorptive polarizer 299 and a second polarization switch 297 disposed between the first stack and the eye-box region 160. The second polarization switch 297 may be disclosed between the absorptive polarizer 299 and the first stack, and the absorptive polarizer 299 may be disclosed between the second polarization switch 297 and the eye-box region 160.

The absorptive polarizer 299 may function as a "clean up" polarizer that removes an image light having an undesirable polarization (e.g., caused by undesirable diffraction of the PBP lens 207) via absorption. In some embodiments, when the image light 204 output from the first lens assembly 201 is a circularly polarized light having a predetermined handedness, the absorptive polarizer 299 may be configured to substantially block a circular polarized light having the predetermined handedness via absorption, and substantially transmit a circularly polarized light having a handedness that is opposite to the predetermined handedness. The second polarization switch 297 may be similar to the first polarization switch 205 shown in FIG. 2A. In some embodiments, the second polarization switch 297 may include a switchable half-wave plate. In some embodiments, an operation state of the second polarization switch 297 may be synchronized with the first polarization switch 205.

For example, referring to FIGS. 2B-2C and FIG. 2J, the image light 204 may be an RHCP light, and the absorptive polarizer 299 may be configured to substantially block an RHCP light, and substantially transmit an LHCP light. Referring to FIG. 2B and FIG. 2J, the undesirable diffraction of the PBP lens 207 may result in a leaked image light 292 that is an LHCP image light. The second polarization switch 297 may be synchronized with the first polarization switch 205 to operate in the switching state to convert the leaked image light (that is an RHCP light) 292 to an leaked image light (that is an RHCP light) 294 toward the absorptive polarizer 299. The absorptive polarizer 299 may block the leaked image light (that is an RHCP light) 294. Thus, the eye 150 may not perceive a ghost image caused by the leaked image light (that is an RHCP light) 294. On the other hand, the image light 210 output from the tunable lens 209 may be an RHCP light, which is converted into an image light (that is an LHCP light) 296 by the second polarization switch 297. Thus, the absorptive polarizer 299 may transmit the image light (that is an LHCP light) 296 toward the eye-box region 160.

Referring to FIG. 2C and FIG. 2J, the undesirable diffraction of the PBP lens 207 may result in the leaked image light 292 that may be an RHCP image light. The second polarization switch 297 may be synchronized with the first polarization switch 205 to operate in the non-switching state to transmit the leaked image light (that is an RHCP light) 292 as the leaked image light (that is an RHCP light) 294 toward the absorptive polarizer 299. The absorptive polarizer 299 may block the leaked image light (e.g., that is RHCP light) 294. Thus, the eye 150 may not perceive a ghost image caused by the leaked image light (that is an RHCP light) 294. On the other hand, the image light 210 output from the tunable lens 209 may be an LHCP light, which is transmitted as the image light (that is an LHCP light) 296 by the second polarization switch 297. Thus, the absorptive polarizer 299 may transmit the image light (that is an LHCP light) 296 toward the eye-box region 160. A configuration that is similar to the combination of the second polarization switch 297 and the absorptive polarizer 299 is discussed in U.S. Pat. No. 11,175,508, which is incorporated herein by reference for all purposes.

Figure 2H:
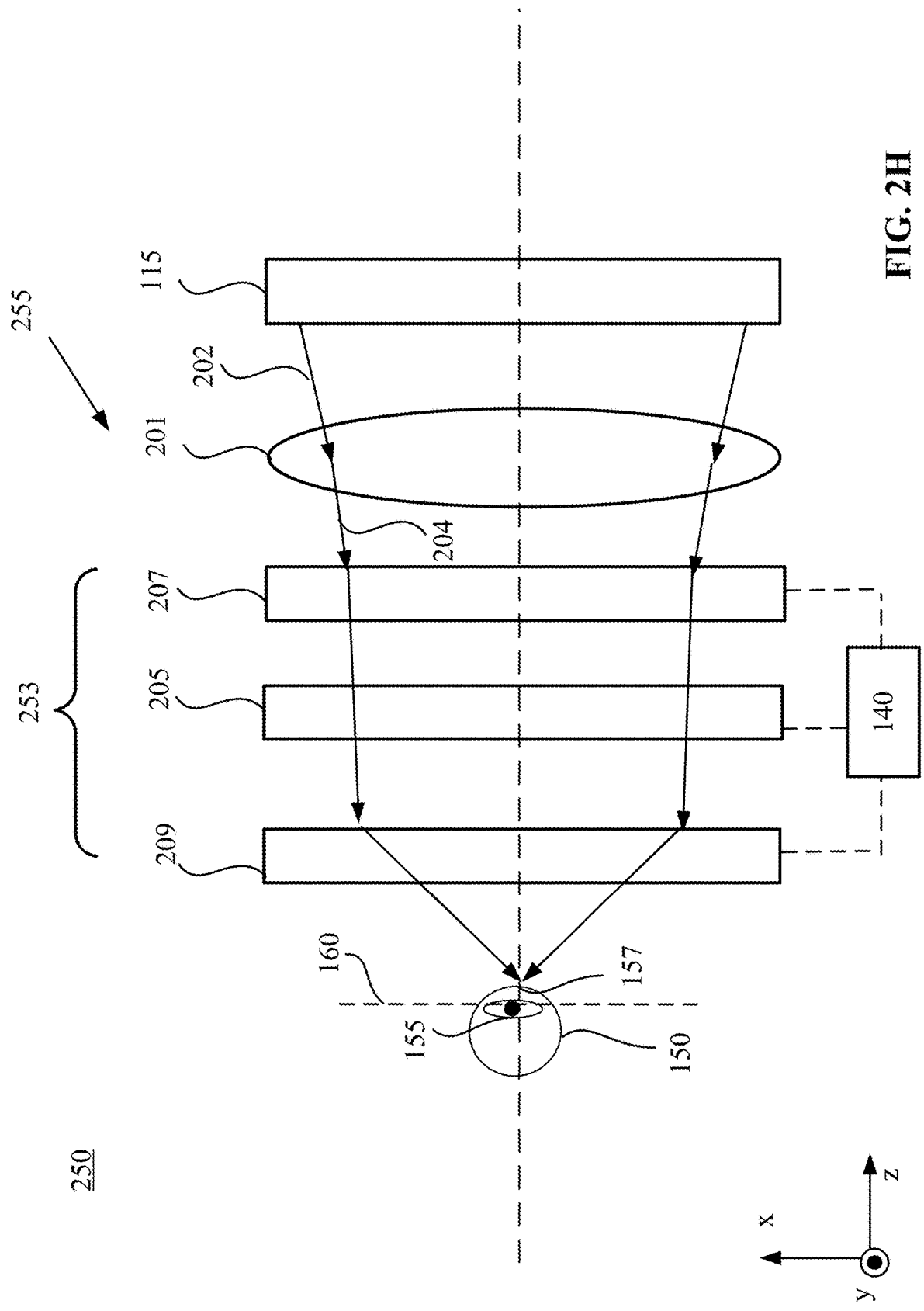
FIG. 2H schematically illustrates a diagram of a system including a varifocal device, according to an embodiment of the present disclosure.
Figure 2I:
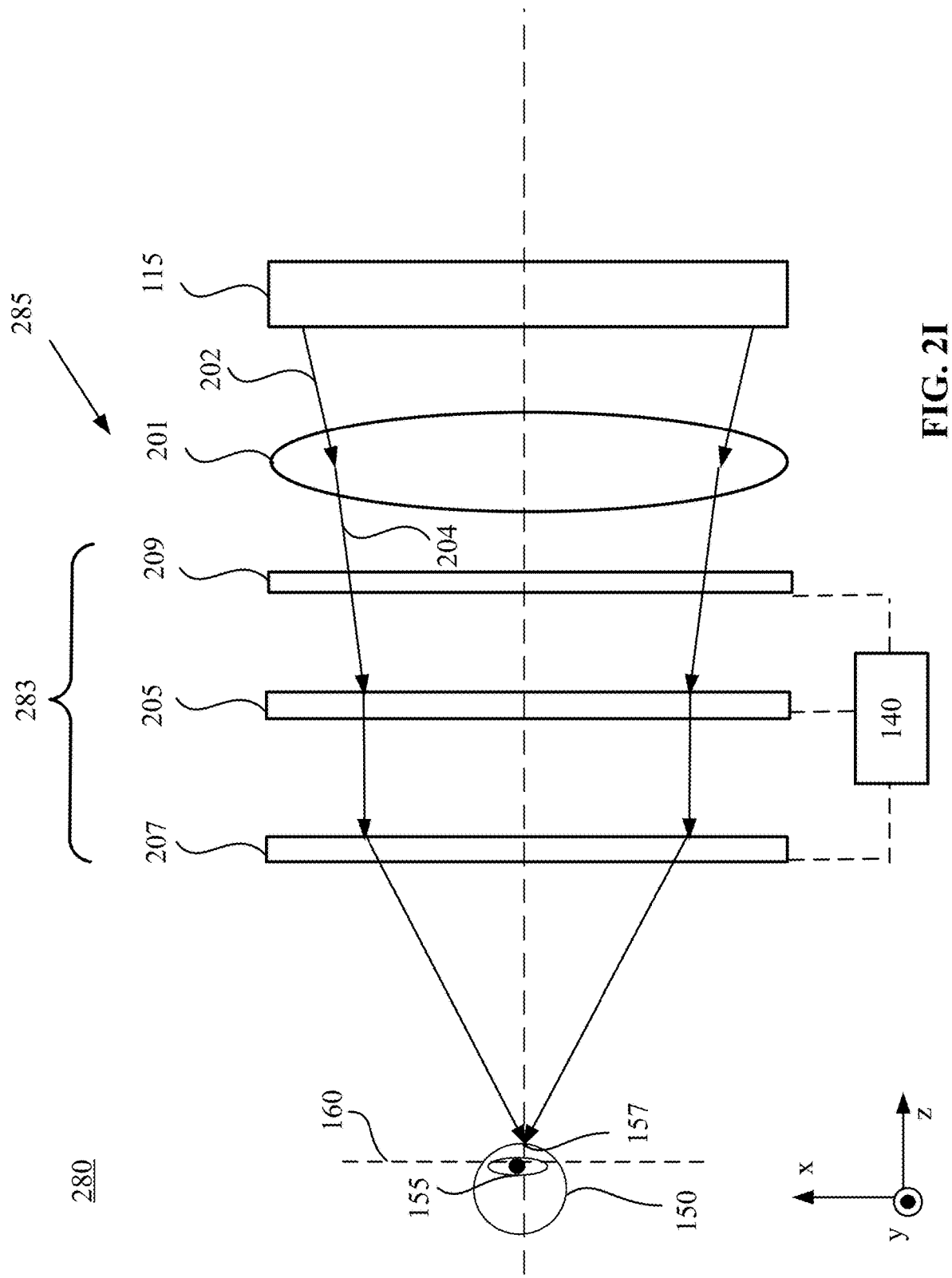
FIG. 2I schematically illustrates a diagram of a system including a varifocal device, according to an embodiment of the present disclosure.
Figure 2J:
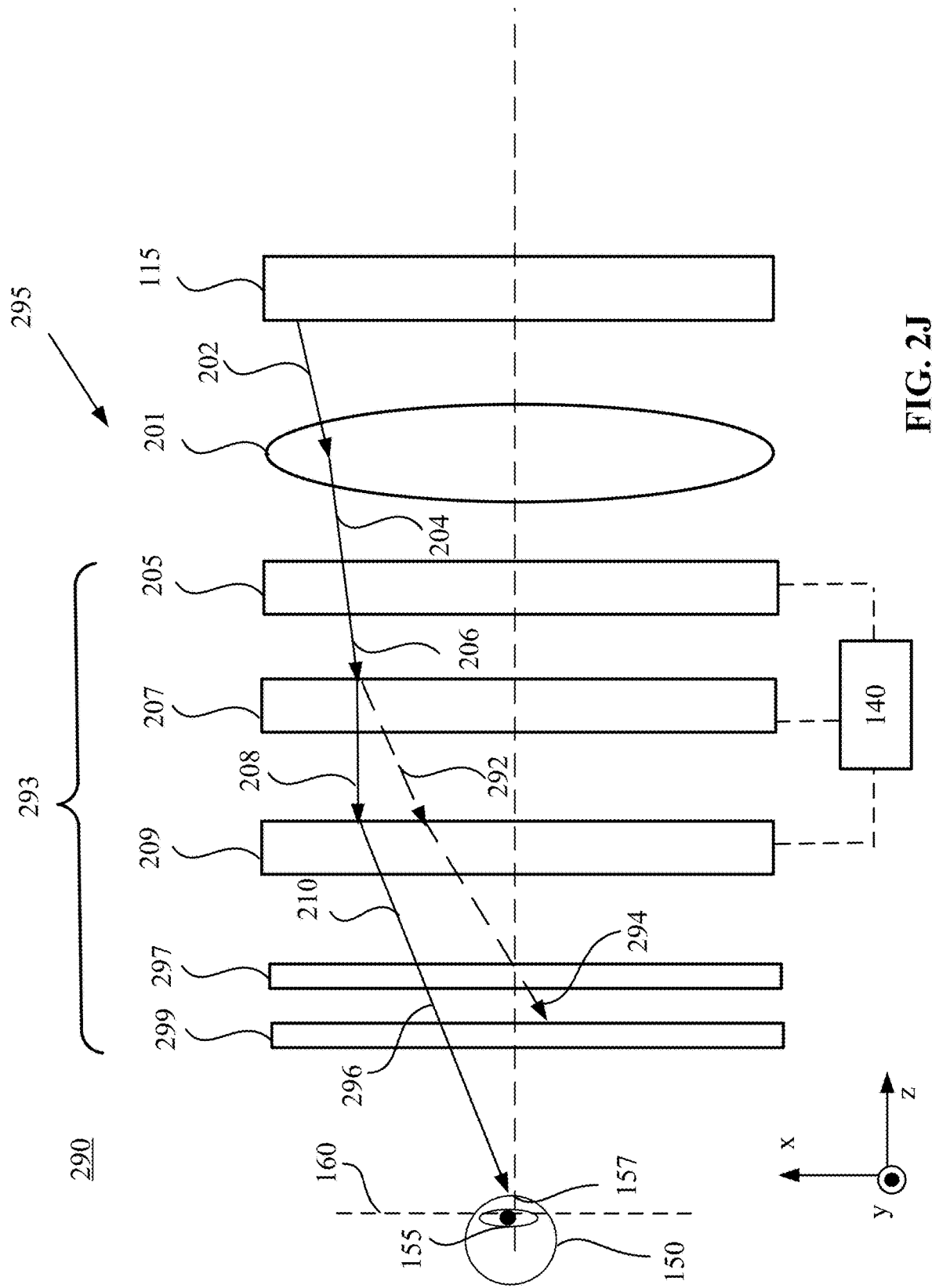
FIG. 2J schematically illustrates a diagram of a system including a varifocal device, according to an embodiment of the present disclosure.

FIG. 2H schematically illustrates a diagram of a system 250, according to an embodiment of the present disclosure. The system 250 may include elements, structures, and/or functions that are the same as or similar to those included in the system 200 shown in FIGS. 2A-2G. Descriptions of the same or similar elements, structures, and/or functions can refer to the above descriptions rendered in connection with FIGS. 2A-2G. As shown in FIG. 2H, the system 250 may include the electronic display 115 and a varifocal device 255. The varifocal device 255 may be an embodiment of the varifocal device 125 shown in FIG. 1B. The varifocal device 225 may include the first lens assembly 201 and a second lens assembly 253 arranged in an optical series. The second lens assembly 253 may include the PBP lens 207, the polarization switch 205, and the tunable lens 209 arranged in an optical series. The polarization switch 205 may be disposed between the PBP lens 207 and the tunable lens 209. The PBP lens 207 may be disposed between the polarization switch 205 and the first lens assembly 201.

In the embodiment shown in FIG. 2H, the PBP lens 207, the polarization switch 205, and the tunable lens 209 are shown as being spaced apart from one another by a gap. In some embodiments, the PBP lens 207, the polarization switch 205, and the tunable lens 209 may be stacked without a gap (e.g., through direct contact). FIG. 2H shows the PBP lens 207, the polarization switch 205, and the tunable lens 209 have flat surfaces for illustrative purposes. In some embodiments, one or more of the PBP lens 207, the polarization switch 205, and the tunable lens 209 may have a curved surface.

Compared to the optical power adjustment range of the tunable lens 209 (e.g., from −1 Diopter to +1 Diopter), the second lens assembly 253 may be configured to provide an enlarged optical power adjustment range. Thus, the second lens assembly 253 may have an improved capability of mitigating the vergence accommodation conflict. Accordingly, the varifocal device 255 may have an improved capability of mitigating the vergence accommodation conflict. In addition, compared to the first step resolution provided by the PBP lens 207, the second lens assembly 253 may be configured to provide a reduced step resolution (as the second step resolution is substantially smaller than the first step resolution), which may improve the image quality when the optical power of the second lens assembly 253 continuously varies in the second step resolution. Accordingly, the image quality of the varifocal device 255 may be improved.

Figure 6A:
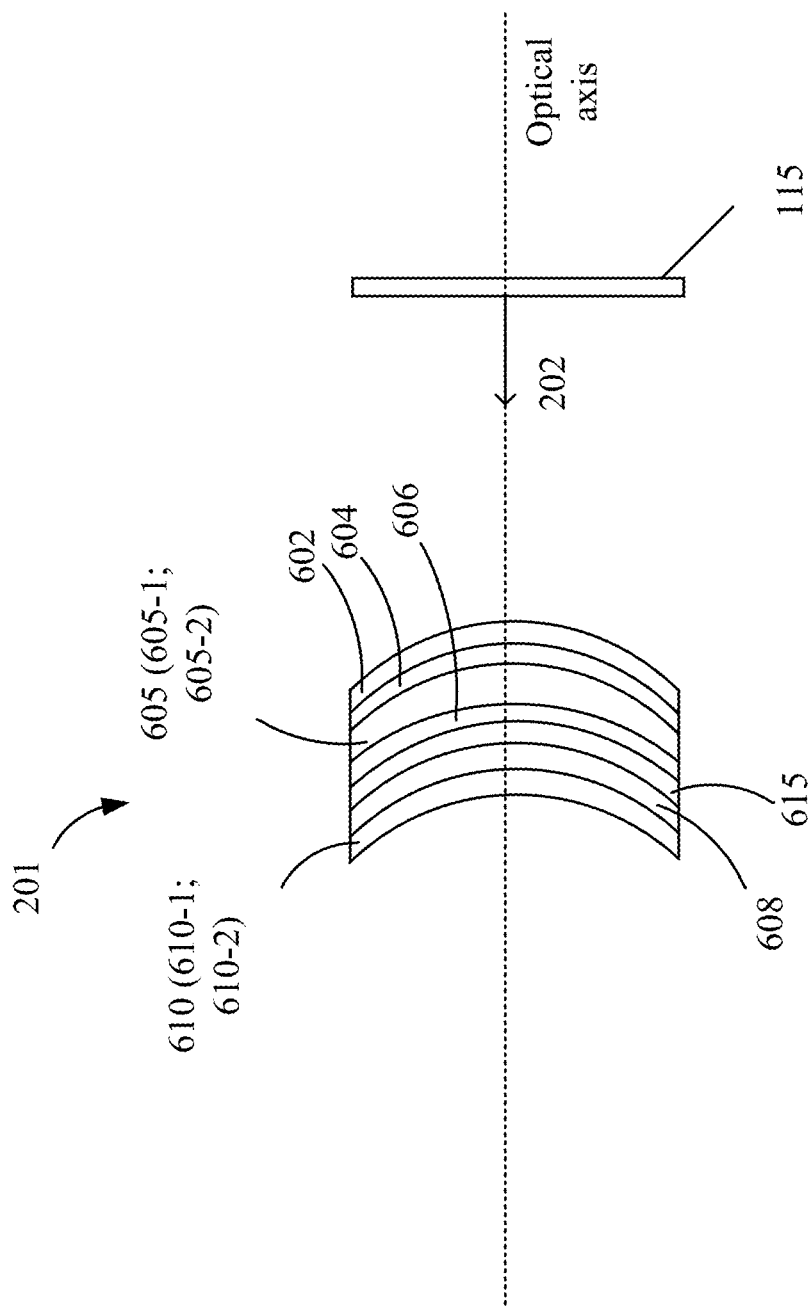
FIG. 6A schematically illustrates a first lens assembly included in the varifocal device shown in FIG. 2A, FIG. 2H, FIG. 2I, or FIG. 2J, according to an embodiment of the present disclosure.

FIG. 6A schematically illustrates the first lens assembly 201 included in the varifocal device 225 shown in FIG. 2A, the varifocal device 255 shown in FIG. 2H, the varifocal device 285 shown in FIG. 2I, or the varifocal device 295 shown in FIG. 2J, according to an embodiment of the present disclosure. As shown in FIG. 6A, the first lens assembly 201 may include a first optical lens 605 and a second optical lens 610 arranged in a stacked configuration. In some embodiments, the first lens assembly 201 may be configured as a monolithic pancake lens assembly without any air gaps between optical elements included in the pancake lens assembly. In some embodiments, one or more surfaces of the first optical lens 605 and the second optical lens 610 may be shaped (e.g., curved) to compensate for field curvature. In some embodiments, one or more surfaces of the first optical lens 605 and/or the second optical lens 610 may be shaped to be spherically concave (e.g., a portion of a sphere), spherically convex, a rotationally symmetric asphere, a freeform shape, or some other shape that can mitigate field curvature. In some embodiments, the shape of one or more surfaces of the first optical lens 605 and/or the second optical lens 610 may be designed to additionally compensate for other forms of optical aberration. In some embodiments, one or more of the optical elements within the first lens assembly 201 may have one or more coatings, such as an anti-reflective coating, to reduce ghost images and enhance contrast. In some embodiments, the first optical lens 605 and the second optical lens 610 may be coupled together by an adhesive or adhesive layer 615. Each of the first optical lens 605 and the second optical lens 610 may include one or more optical lenses. In some embodiments, at least one of the first optical lens 605 or the second optical lens 610 may have at least one flat surface.

The first optical lens 605 may include a first surface 605-1 facing the electronic display 115 and an opposing second surface 605-2 facing the second optical lens 610. The first optical lens 605 may be configured to receive the image light 202 at the first surface 605-1 from the electronic display 115, and output an image light with an altered property at the second surface 605-2. In some embodiments, the first lens assembly 201 may also include a linear polarizer 602, a waveplate 604, and a mirror 606 arranged in an optical series, each of which may be an individual layer, film, or coating disposed at (e.g., bonded to or formed at) the first optical lens 605. The linear polarizer 602, the waveplate 604, and the mirror 606 may be disposed at (e.g., bonded to or formed at) the first surface 605-1 or the second surface 605-2 of the first optical lens 605. For discussion purposes, FIG. 6A shows that the linear polarizer 602 and the waveplate 604 are disposed at (e.g., bonded to or formed at) the first surface 605-1 facing the electronic display 115, and the mirror 606 is disposed at (e.g., bonded to or formed at) the second surface 605-2 facing the second optical lens 610. Other arrangements are also contemplated.

In some embodiments, the waveplate 604 may be a quarter-wave plate ("QWP"). A polarization axis of the waveplate 604 may be oriented relative to the polarization direction of a linearly polarized light to convert the linearly polarized light to a circularly polarized light or vice versa for a visible spectrum and/or an IR spectrum. In some embodiments, for an achromatic design, the waveplate 604 may include a multilayer birefringent material (e.g., polymer, liquid crystals, or a combination thereof) to produce quarter-wave birefringence across a wide spectral range. For example, an angle between the polarization axis (e.g., the fast axis) of the waveplate 604 and the transmission axis of the linear polarizer 602 may be configured to be in a range of about 35-50 degrees. In some embodiments, for a monochrome design, an angle between the polarization axis (e.g., the fast axis) of the waveplate 604 and the transmission axis of the linear polarizer 602 may be configured to be about 45 degrees. In some embodiments, the mirror 606 may be a polarization non-selective partial reflector that is partially reflective to reflect a portion of a received light. In some embodiments, the mirror 606 may be configured to transmit about 50% and reflect about 50% of a received light, and may be referred to as a "50/50 mirror." In some embodiments, the handedness of the reflected light may be reversed, and the handedness of the transmitted light may remain unchanged.

The second optical lens 610 may have a first surface 610-1 facing the first optical lens 605 and an opposing second surface 610-2 facing the second lens assembly 203 shown in FIG. 2A, the second lens assembly 253 shown in FIG. 2H, the second lens assembly 283 shown in FIG. 2I, or the second lens assembly 293 shown in FIG. 2J. The first lens assembly 201 may also include a reflective polarizer 608, which may be an individual layer, film, or coating disposed at (e.g., bonded to or formed at) the second optical lens 610. The reflective polarizer 608 may be configured to primarily reflect a circularly polarized light having a first handedness and primarily transmit a circularly polarized light having a second handedness that is orthogonal to the first handedness.

The reflective polarizer 608 may be disposed at (e.g., bonded to or formed at) the first surface 610-1 or the second surface 610-2 of the second optical lens 610 and may receive a light output from the mirror 606. For discussion purposes, FIG. 6A shows that the reflective polarizer 608 is disposed at (e.g., bonded to or formed at) the first surface 610-1 of the second optical lens 610. That is, the reflective polarizer 608 may be disposed between the first optical lens 605 and the second optical lens 610. For example, the reflective polarizer 608 may be disposed between the second surface 610-2 of the second optical lens 610 and the adhesive layer 615. In some embodiments, the reflective polarizer 608 may be disposed at the first surface 610-1 of the second optical lens 610. The first surface 610-1 may face the polarization switch 205, when the first lens assembly 201 is implemented in the embodiment shown in FIG. 2A, or may face the PBP lens 207 when the first lens assembly 201 is implemented in the embodiment shown in FIG. 2H.

Referring to FIG. 6A, in some embodiments, the image light 202 emitted from the electronic display 115 may be an unpolarized light. The linear polarizer 602 and the waveplate 604 may be replaced by a circular polarizer, which may be configured to the convert the unpolarized light to a circularly polarized light, and direct the circularly polarized light toward the mirror 606. In some embodiments, the image light 621 emitted from the electronic display 115 may be a linearly polarized light, and the linear polarizer 602 may be omitted. A polarization axis of the waveplate 604 may be oriented relative to the polarization direction of the linearly polarized light to convert the linearly polarized light to a circularly polarized light or vice versa for a visible spectrum and/or an IR spectrum.

The first lens assembly 201 shown in FIG. 6A is merely for illustrative purposes. In some embodiments, one or more of the first surface 605-1 and the second surface 605-2 of the first optical lens 605 and the first surface 610-1 and the second surface 610-2 of the second optical lens 610 may be curved surface(s) or flat surface(s). In some embodiments, the first lens assembly 201 may have one optical element or more than two optical elements. In some embodiments, the first lens assembly 201 may further include other optical elements in addition to the first and second optical elements 605 and 610, such as one or more linear polarizers, one or more waveplate, one or more circular polarizers, etc.

Figure 6B:
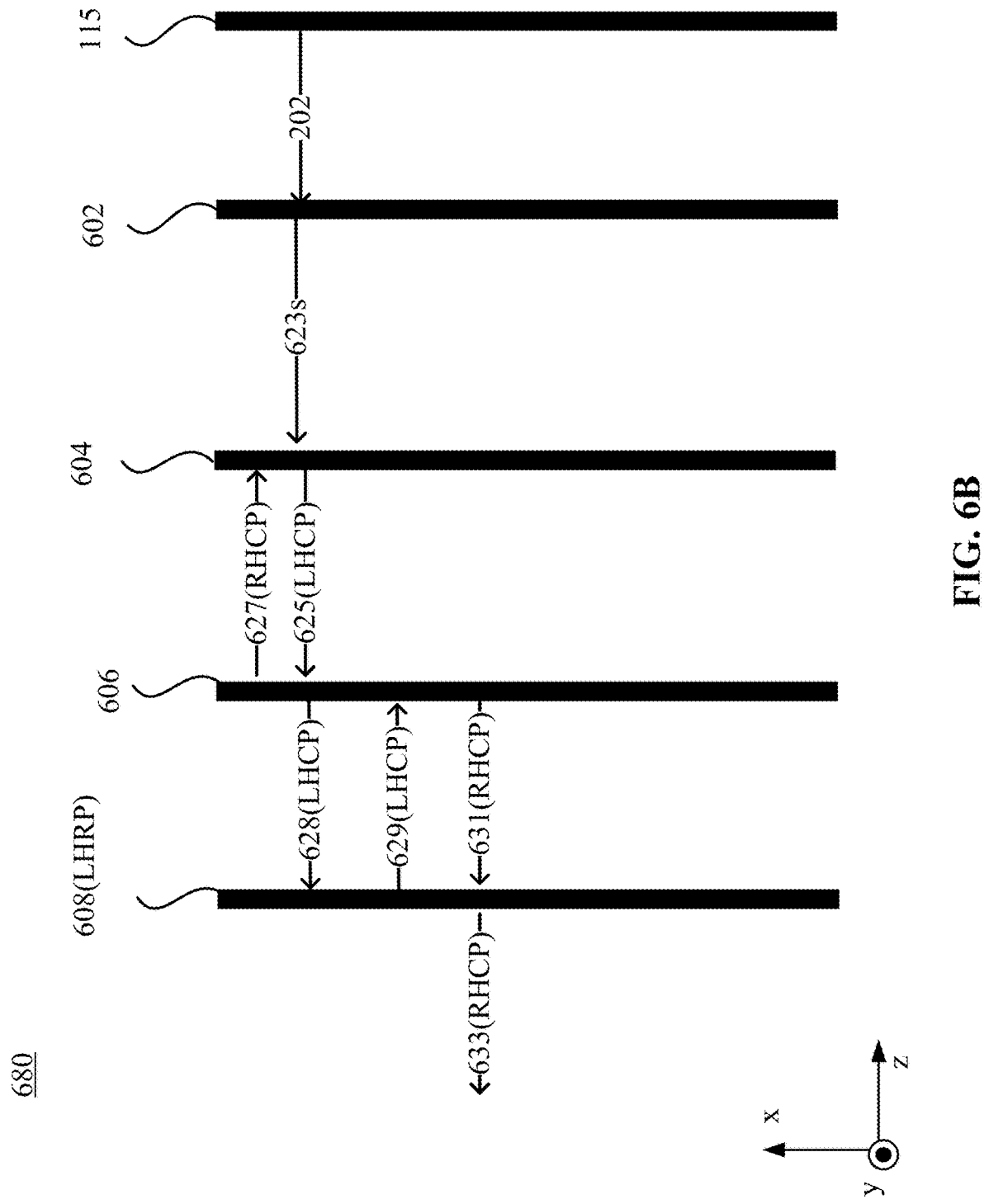
FIG. 6B schematically illustrates an optical path in the first lens assembly shown in FIG. 6A, according to an embodiment of the present disclosure.

FIG. 6B illustrates a schematic cross-sectional view of an optical path 680 of a light propagating in the first lens assembly 201 shown in FIG. 6A, according to an embodiment of the present disclosure. In the light propagation path 680, the change of polarization of the light is shown. The first optical lens 605 and the second optical lens 610, which are presumed to be lenses that do not affect the polarization of the light, are omitted for the simplicity of illustration. In FIG. 6B, the character "s" denotes that the corresponding light is s-polarized, "RHCP" and "LHCP" denote right-handed circularly polarized light and left-handed circularly polarized light, respectively. For discussion purposes, as shown in FIG. 6B, the linear polarizer 602 may be configured to transmit an s-polarized light and block a p-polarized light, and the reflective polarizer 608 may be a left-handed reflective polarizer. For illustrative purposes, the electronic display 115, the linear polarizer 602, the waveplate 604, the mirror 606, and the reflective polarizer 608 are illustrated as flat surfaces in FIG. 6B. In some embodiments, one or more of the electronic display 115, the linear polarizer 602, the waveplate 604, the mirror 606, and the reflective polarizer 608 may include a curved surface.

As shown in FIG. 6B, the electronic display 115 may generate the unpolarized image light 202 covering a predetermined spectrum, such as a portion of the visible spectral range or substantially the entire visible spectral range. The unpolarized image light 202 may be transmitted by the linear polarizer 602 as an s-polarized image light 623s, which may be transmitted by the waveplate 604 as an LHCP image light 625. A first portion of the LHCP image light 625 may be reflected by the mirror 606 as an RHCP image light 627 toward the waveplate 604, and a second portion of the LHCP image light 625 may be transmitted as an LHCP image light 628 toward the reflective polarizer 608. The LHCP image light 628 incident onto the reflective polarizer 608 may have the same handedness (e.g., the left handedness) as that of the helical twist structure of the reflective polarizer 608. The LHCP image light 628 may be reflected by the reflective polarizer 608 as an LHCP image light 629 toward the mirror 606. The LHCP image light 629 may be reflected by the mirror 606 as an RHCP image light 631, which may be transmitted through the reflective polarizer 608 as an RHCP image light 633 toward the second lens 610 (not shown in FIG. 6B). The second lens 610 may transform the RHCP image light 633 as the image light 204 propagating toward the second lens assembly 203 shown in FIG. 2A, the second lens assembly 253 shown in FIG. 2H, the second lens assembly 283 shown in FIG. 2I, or the second lens assembly 293 shown in FIG. 2J.

Figure 3A:
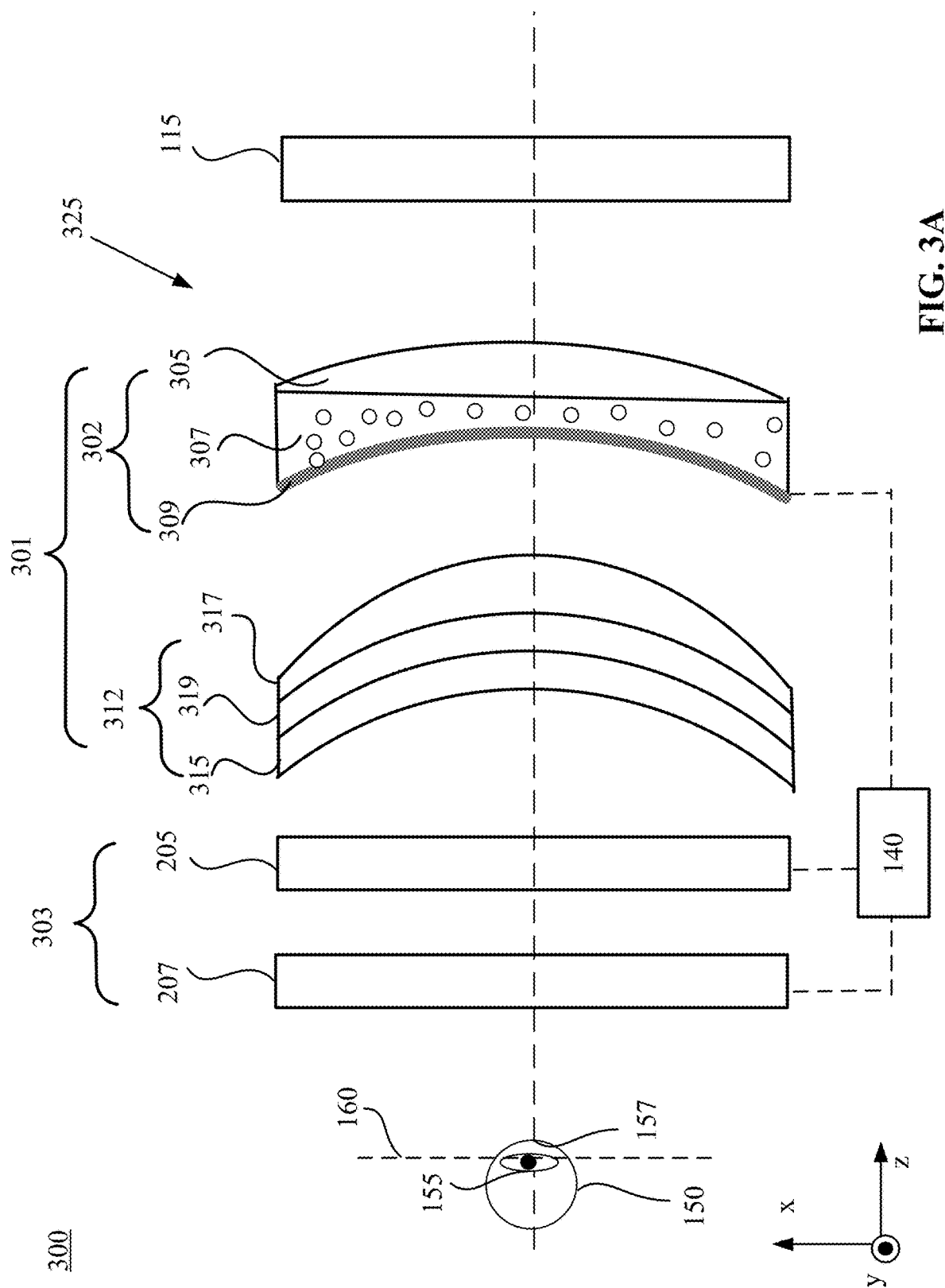
FIG. 3A schematically illustrates a diagram of a system including a varifocal device, according to an embodiment of the present disclosure.

Referring to FIG. 3A, FIG. 3A schematically illustrates a diagram of a system 300, according to an embodiment of the present disclosure. The system 300 may include elements, structures, and/or functions that are the same as or similar to those included in the system 200 shown in FIGS. 2A-2G, the system 250 shown in FIG. 2H, the system 280 shown in FIG. 2I, or the system 290 shown in FIG. 2J. Descriptions of the same or similar elements, structures, and/or functions can refer to the above descriptions rendered in connection with FIGS. 2A-2G, FIG. 2H, FIG. 2I, or FIG. 2J.

As shown in FIG. 3A, the system 300 may include the electronic display 115 and a varifocal device 325. The varifocal device 325 may be an embodiment of the varifocal device 125 shown in FIG. 1B. The varifocal device 325 may include a first lens assembly 301 and a second lens assembly 303 arranged in an optical series. The system 300 may also include the controller 140 that may be communicatively coupled with various elements in the first lens assembly 301 and the second lens assembly 303, and configured to control the operation of the various elements.

The second lens assembly 303 may include the polarization switch 205 and the PBP lens 207 arranged in an optical series. The polarization switch 205 may be disposed between the PBP lens 207 and the first lens assembly 301. The PBP lens 207 may be configured to provide an optical power that is variable within the first optical power adjustment range at the first step resolution (unit: Diopter).

In some embodiments, the second lens assembly 303 may include additional elements that are not shown in FIG. 3A. For example, the second lens assembly 303 may include an absorptive polarizer disposed between the PBP lens 207 and the eye 150. In the embodiment shown in FIG. 3A, the polarization switch 205 and the PBP lens 207 are shown as being spaced apart from one another by a gap. In some embodiments, the polarization switch 205 and the PBP lens 207 may be stacked without a gap (e.g., through direct contact). FIG. 3A shows the polarization switch 205 and the PBP lens 207 have flat surfaces for illustrative purposes. In some embodiments, one or more of the polarization switch 205 and the PBP lens 207 may have a curved surface.

In some embodiments, the first lens assembly 301 may be a folded (or path-folding) lens assembly with a variable optical power. The folded lens assembly may increase the length of an optical path of the image light projected from the display element 115 toward the exit pupil 157. The first lens assembly 301 may be configured to provide an optical power that is variable within the second optical power adjustment range at the second step resolution (unit: Diopter). In the disclosed embodiments, the second step resolution may be configured to be smaller than the first step resolution, e.g., smaller than or equal to ⅒ (or ½₀, ⅕, ⅕, or any other suitable fraction) of the first step resolution. In some embodiments, the second step resolution may be less than or equal to 0.05 Diopter, 0.06 Diopter, 0.07 Diopter, 0.08 Diopter, 0.09 Diopter, or 0.1 Diopter, etc., and the first step resolution may be greater than or equal to 0.5 Diopter, 0.6 Diopter, 0.7 Diopter, 0.8 Diopter, 0.9 Diopter, or 1.0 Diopter, etc. Thus, the varifocal device 325 may be configured to provide an enlarged optical power adjustment range in a reduced step resolution (e.g., the second step resolution). Accordingly, the varifocal device 325 may have an improved capability of mitigating the vergence accommodation conflict, and may provide an improved image quality at the eye-box region 160 of the system 300.

In some embodiments, the first lens assembly 301 may include a first optical component 302 and a second optical component 312 disposed apart from the first optical component 302 by a gap. The first optical component 302 may be a first tunable optical lens (also referred to as 302 for discussion purposes) configured with a variable optical power that is variable at the second step resolution (unit: Diopter). In some embodiments, the first optical lens 302 may be a membrane liquid lens, e.g., similar to the tunable lens 209 shown in FIG. 2E. For example, the first optical lens 302 may include an optical fluid 307 encapsulated by a substate 305 and a deformable member (e.g., membrane) 309. For discussion purposes, the deformable member 309 may be deemed as the deformable optical interface of the first optical lens 302, and the optical fluid 307 and the outside environment (e.g., air) at opposite sides of the deformable member 309 may have different refractive indices.

In some embodiments, as shown in FIG. 3A, the substate 305 may be disposed at a first side of the first optical lens 302 facing the display element 115, and the deformable member 309 may be disposed at a second side of the first optical lens 302 facing the second optical component 312. The optical fluid 307 may have a refractive index greater than the refractive index of the outside environment (e.g., air). The optical fluid 307 and the substate 305 may be optically transparent. In some embodiments, although not shown, the substate 305 may be disposed at the second side of the first optical lens 302 facing the second optical component 312, and the deformable member 309 may be disposed at the first side of the first optical lens 302 facing the display element 115.

The deformable member 309 may be partially reflective and partially transmissive. In some embodiments, the deformable member 309 may be coated with a partially reflective and partially transmissive coating. In embodiments, the deformable member 309 may be made of a material that is partially reflective and partially transmissive. In some embodiments, the deformable member 309 may be configured to transmit about 50% and reflect about 50% of an input light, and hence may be referred to as a "50/50 deformable mirror". In some embodiments, the deformable member 309 may substantially maintain a polarization of a polarized input light while transmitting the polarized input light, and change the polarization of the polarized input light to an orthogonal polarization while reflecting the polarized input light.

The deformable member 309 may be deformed through various mechanisms. For example, the deformable member 309 may deform when driven, or a supporting member coupled with the deformable member 309 is driven, by a mechanical actuator, a piezo actuator, or a voice coil actuator, etc. For example, the actuator may be electrically coupled with the controller 140, and the controller 140 may control the output of the actuator to drive the deformable member 309 or the supporting member coupled with the deformable member 309 to change the shape of the deformable member 309. When the deformable member 309 is a membrane, the first optical lens 302 may be referred to as a membrane liquid lens, or a liquid-filled lens. In some embodiments, the first optical lens 302 may be a mechanical varifocal liquid lens, an edge actuator liquid lens, or an edge driven membrane liquid lens, etc.

In some embodiments, one or more surfaces of the first optical lens 302 (e.g., the deformable member 309 and/or the substrate 305) may be configured with a shape to correct a field curvature. For example, one or more surfaces of the first optical lens 302 may be configured with a spherically concave shape (e.g., a portion of a sphere), a spherically convex shape, a rotationally symmetric asphere shape, a freeform shape, or other shapes that may mitigate a field curvature. In some embodiments, the shape of one or more surfaces of the first optical lens 302 may be configured to additionally correct other forms of optical aberrations. The substate 305 may be made of a suitable optical material that is substantially transparent in the visible spectrum, e.g., glass, polymer, or resin, etc. In some embodiments, the first optical component 302 may include additional elements not shown in FIG. 3A, such as a polarizer, and/or a quarter-wave plate, etc. For example, the first optical component 302 may include a waveplate (e.g., a quarter-wave plate) disposed at a suitable place between the deformable member 309 and the display element 115. In some embodiments, the waveplate (e.g., quarter-wave plate) may be a layer or coating disposed at (e.g., bonded to or formed on) the surface of the substrate 305.

The second optical component 312 may include a second optical lens 317 and a reflective polarizer 319 arranged in an optical series. In some embodiments, as shown in FIG. 3A, the reflective polarizer 319 may be disposed between the second optical lens 317 and the eye-box region 160. In some embodiments, the second optical lens 317 may be disposed between the reflective polarizer 319 and the second lens assembly 303. The second optical lens 317 may be made of a suitable optical material that is substantially transparent in the visible spectrum, e.g., glass, polymer, or resin, etc. In some embodiments, as shown in FIG. 3A, the second optical lens 317 may be configured with a fixed optical power. In some embodiments, one or more surfaces of the second optical lens 317 may be configured with a shape to correct a field curvature. For example, one or more surfaces of the second optical lens 317 may be configured with a spherically concave shape (e.g., a portion of a sphere), a spherically convex shape, a rotationally symmetric asphere shape, a freeform shape, or other shapes that may mitigate a field curvature. In some embodiments, the shape of one or more surfaces of the second optical lens 317 may be configured to additionally correct other forms of optical aberrations.

In some embodiments, the reflective polarizer 319 may be a layer or coating disposed at (e.g., bonded to or formed on) a surface of the second optical lens 317. The reflective polarizer 319 may be configured to substantially reflect a polarized light having a predetermined polarization, and substantially transmit a polarized light having a polarization that is orthogonal to the predetermined polarization. The reflective polarizer 319 may be a circular reflective polarizer, or a linear reflective polarizer. In some embodiments, when the reflective polarizer 319 is a linear reflective polarizer, a waveplate (e.g., a quarter-wave plate) may be disposed between the reflective polarizer 319 and the second lens assembly 303 to covert a linearly polarized image light output from the reflective polarizer 319 into a circularly polarized image light propagating toward the second lens assembly 303. In some embodiments, the waveplate (e.g., quarter-wave plate) may be a layer or coating disposed at (e.g., bonded to or formed on) the surface of the second optical lens 317. In some embodiments, when the reflective polarizer 319 is a circular reflective polarizer, the waveplate (e.g., quarter-wave plate) may be omitted.

In some embodiments, the second optical component 312 may also include a polarizer 315 disposed between the reflective polarizer 319 and the second lens assembly 303. In some embodiments, the polarizer 315 may be a layer or coating disposed at (e.g., bonded to or formed on) the surface of the second optical lens 317. The polarizer 315 may be an absorptive polarizer functioning as a "clean up" polarizer that removes an image light having an undesirable polarization via absorption. In some embodiments, the polarizer 315 may be omitted.

Figure 3B:
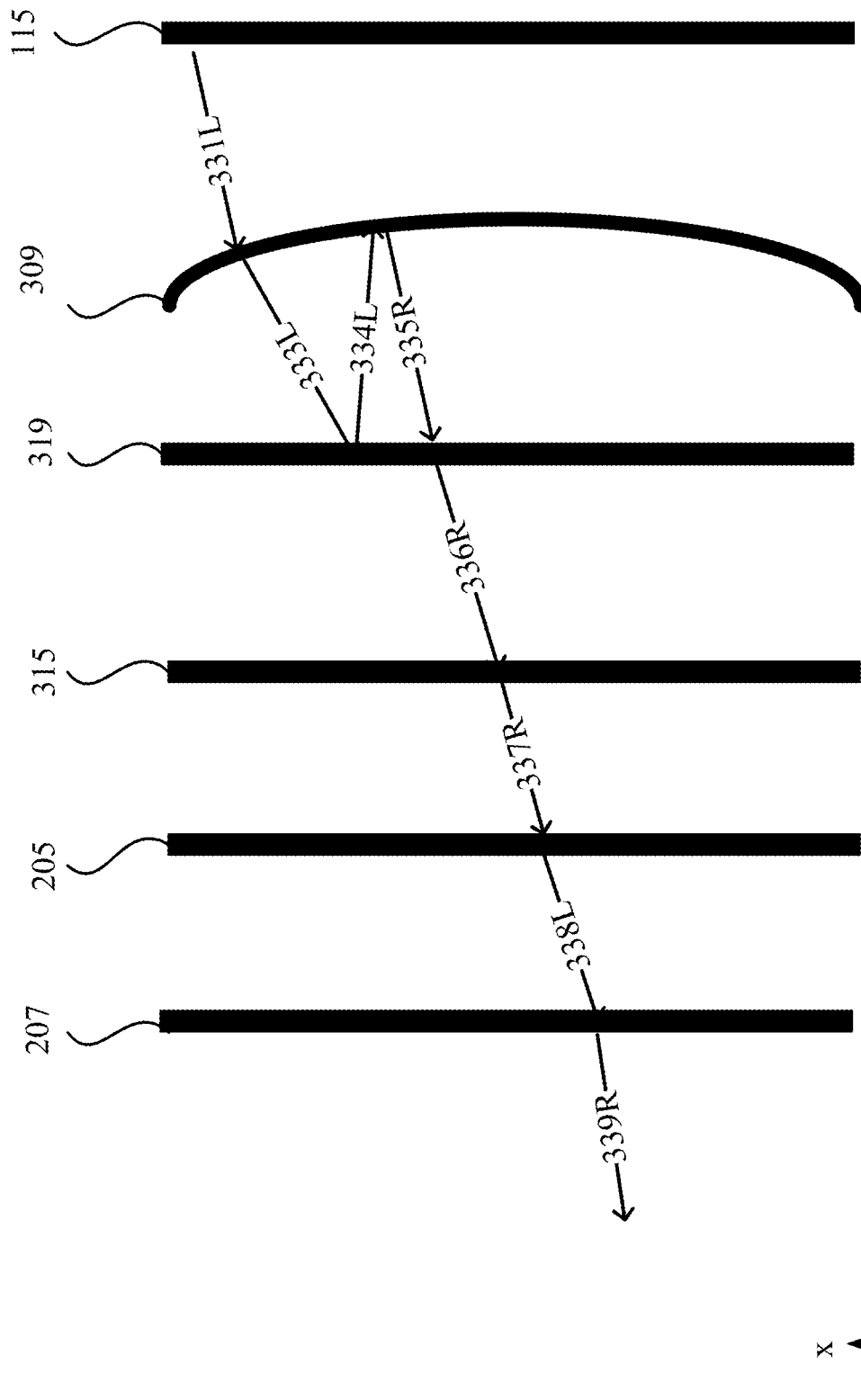
FIG. 3B illustrates an optical path of an image light in the system shown in FIG. 3A, according to an embodiment of the disclosure.

FIG. 3B illustrates an optical path of an image light in the system 300 according to an embodiment of the present disclosure. For the simplicity of illustration, the optical fluid 307, the substrate 305, and the second optical lens 317 are omitted in FIG. 3B. For the simplicity of illustration, the reflective polarizer 319 and the polarizer 315 are drawn as having flat surfaces. In FIG. 3B, "R" denotes an RHCP light, and "L" denotes an LHCP light. For discussion purposes, in FIG. 3B, an image light 331L emitted from the display element 115 may be an LHCP light. The deformable member 309 (which may be a deformable mirror) may transmit a first portion of the image light 331L as an LHCP image light 333L toward the reflective polarizer 319, and reflect a second portion of the image light 331L as an RHCP image light (not shown) back toward the display element 115. In FIG. 3B, the reflective polarizer 319 may be a circular reflective polarizer configured to substantially reflect an LHCP light, and substantially transmit an RHCP light. Thus, the reflective polarizer 319 may reflect the LHCP image light 333L back to the deformable mirror 309 as an LHCP image light 334L. The deformable mirror 309 may reflect the LHCP image light 334L as an RHCP image light 335R toward the reflective polarizer 319. The reflective polarizer 319 may substantially transmit the RHCP image light 335R as an RHCP image light 336R toward the polarizer 315. The polarizer 315 may be an absorptive circular polarizer that transmits the RHCP image light 336R as an RHCP image light 337R toward the polarization switch 205, and blocks an LHCP image light (which may be a light leakage from the reflective polarizer 319) via absorption.

The polarization switch 205 operating in the switching state may transmit the RHCP image light 336R as an LHCP image light. The polarization switch 205 operating in the non-switching state may transmit the RHCP image light 336R as an RHCP image light. For discussion purposes, FIG. 3B shows that the polarization switch 205 operates in the switching state, and transmits the RHCP image light 336R as an LHCP image light 338L towards the PBP lens 207. The PBP lens 207 may focus or defocus the LHCP image light 338L into an RHCP image light 339R propagating toward one or more exit pupils 157 within the eye-box region 160.

Figure 3C:
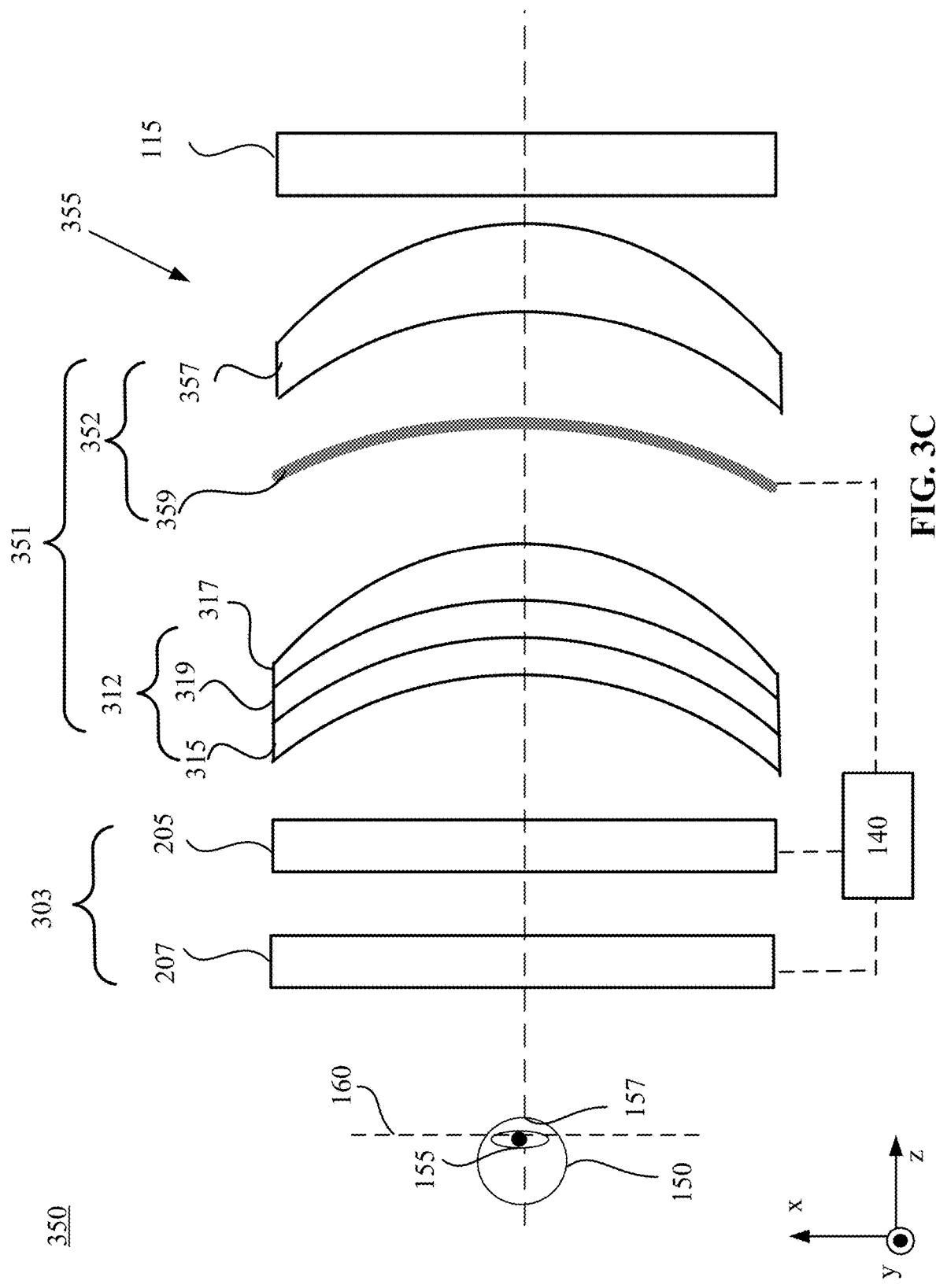
FIG. 3C schematically illustrates a diagram of a system including a varifocal device, according to an embodiment of the present disclosure.

FIG. 3C schematically illustrates a diagram of a system 350, according to an embodiment of the present disclosure. The system 350 may include elements, structures, and/or functions that are the same as or similar to those included in the system 200 shown in FIGS. 2A-2G, the system 250 shown in FIG. 2H, the system 280 shown in FIG. 2I, the system 290 shown in FIG. 2J, or the system 300 shown in FIG. 3A. Descriptions of the same or similar elements, structures, and/or functions can refer to the above descriptions rendered in connection with FIGS. 2A-2G, FIG. 2H, FIG. 2I, FIG. 2J, or FIG. 3A.

As shown in FIG. 3C, the system 350 may include the electronic display 115 and a varifocal device 355. The varifocal device 355 may be an embodiment of the varifocal device 125 shown in FIG. 1B. The varifocal device 355 may include a first lens assembly 351 and the second lens assembly 303 arranged in an optical series. The system 350 may also include the controller 140 that may be communicatively coupled with various elements in the first lens assembly 351 and the second lens assembly 303, and may control the operations of the various elements. The second lens assembly 303 may include the polarization switch 205 and the PBP lens 207 arranged in an optical series. The polarization switch 205 may be disposed between the PBP lens 207 and the first lens assembly 351. The PBP lens 207 may be configured to provide an optical power that is variable within the first optical power adjustment range at the first step resolution (unit: Diopter).

The first lens assembly 351 may be configured to provide an optical power that is variable within the second optical power adjustment range at the second step resolution (unit: Diopter). In the disclosed embodiments, the second step resolution may be configured to be smaller than the first step resolution, e.g., smaller than or equal to 1/10 (or 1/20, 1/15, 1/5, or any other suitable fraction) of the first step resolution. In some embodiments, the second step resolution may be less than or equal to 0.05 Diopter, 0.06 Diopter, 0.07 Diopter, 0.08 Diopter, 0.09 Diopter, or 0.1 Diopter, etc., and the first step resolution may be greater than or equal to 0.5 Diopter, 0.6 Diopter, 0.7 Diopter, 0.8 Diopter, 0.9 Diopter, or 1.0 Diopter, etc. Thus, the varifocal device 355 may be configured to provide an enlarged optical power adjustment range in a reduced step resolution (e.g., the second step resolution). Accordingly, the varifocal device 355 may have an improved capability of mitigating the vergence accommodation conflict, and may provide an improved image quality at the eye-box region 160 of the system 350.

The first lens assembly 351 may include a first optical component 352 and the second optical component 312 arranged in an optical series. The first optical component 352 may be disposed between the second optical component 312 and the display element 115. In some embodiments, as shown in FIG. 3C, the first optical component 352 may include a first optical lens 357 and a deformable member (e.g., membrane) 359 disposed apart from one another by a gap. The deformable member 359 may serve as a deformable optical interface. The first optical lens 357 may be made of a suitable optical material that is substantially transparent in the visible spectrum, e.g., glass, polymer, or resin, etc. In some embodiments, as shown in FIG. 3C, the first optical lens 357 may be configured with a fixed optical power. In some embodiments, one or more surfaces of the first optical lens 357 may be configured with a shape to correct a field curvature. For example, one or more surfaces of the first optical lens 357 may be configured with a spherically concave shape (e.g., a portion of a sphere), a spherically convex shape, a rotationally symmetric asphere shape, a freeform shape, or other shapes that may mitigate a field curvature. In some embodiments, the shape of one or more surfaces of the first optical lens 357 may be configured to additionally correct other forms of optical aberrations.

The deformable member 359 may be a tunable lens configured with a variable optical power that is variable in the second step resolution. In some embodiments, the deformable member 359 may be a free standing element spaced apart from the first optical lens 357. In some embodiments, periphery portions of the deformable member 359 may be coupled with corresponding periphery portions of the first optical lens 357, and a central portion of the deformable member 359 may be spaced apart from a corresponding central portion of the first optical lens 357, such that there is a space for accommodating deformation of the deformable member 359. The deformable member 359 may be disposed at a side of the first optical lens 357 facing the display element 115, or a side of the first optical lens 357 facing the second optical component 312. The deformable member 359 may be partially reflective and partially transmissive. In some embodiments, the deformable member 359 may be referred to as a partial reflector with a variable optical power. In some embodiments, the deformable member 359 may be configured to transmit about 50% and reflect about 50% of an input light, and hence may be referred to as a 50/50 deformable mirror with a variable optical power. In some embodiments, the deformable member 359 may substantially maintain a polarization of a polarized input light while transmitting the polarized input light, and change the polarization of the polarized input light to an orthogonal polarization while reflecting the polarized input light. In some embodiments, the deformable member 359 may be coated with a partially reflective and partially transmissive coating. In some embodiments, the deformable member 359 may be made of a material that is partially reflective and partially transmissive.

The deformable member 359 may be deformable by various mechanisms. For example, the deformable member 359 or a supporting member coupled with the deformable member 359 may be driven by an actuator, e.g., a mechanical actuator, a piezo actuator, or a voice coil actuator, etc., to move or to bend (or extend) to change the shape of the deformable member 359. In some embodiments, the deformable member 359 may include a piezo membrane that is deformable by, e.g., applying a voltage. In some embodiments, the piezo membrane may be configured with a curvature at a non-activating state, e.g., a voltage-off state. The curvature at the non-activating state may be referred to as pre-curvature. As the applied voltage changes, the shape of the piezo membrane may change accordingly, which, in turn, changes the optical power provided by the piezo membrane. In some embodiments, the optical power of the piezo membrane may be configured to vary between 0 Diopter and +1 Diopter, or between 0 Diopter and −1 Diopter.

In some embodiments, the first optical component 352 may include additional elements not shown in FIG. 3C. For example, the first optical component 352 may include a polarizer, a waveplate (e.g., a quarter-wave plate), or a combination thereof, etc. In some embodiments, the polarizer or the waveplate (e.g., quarter-wave plate) may be a layer or coating disposed at (e.g., bonded to or formed on) a surface of the first optical lens 357.

Figure 4A:
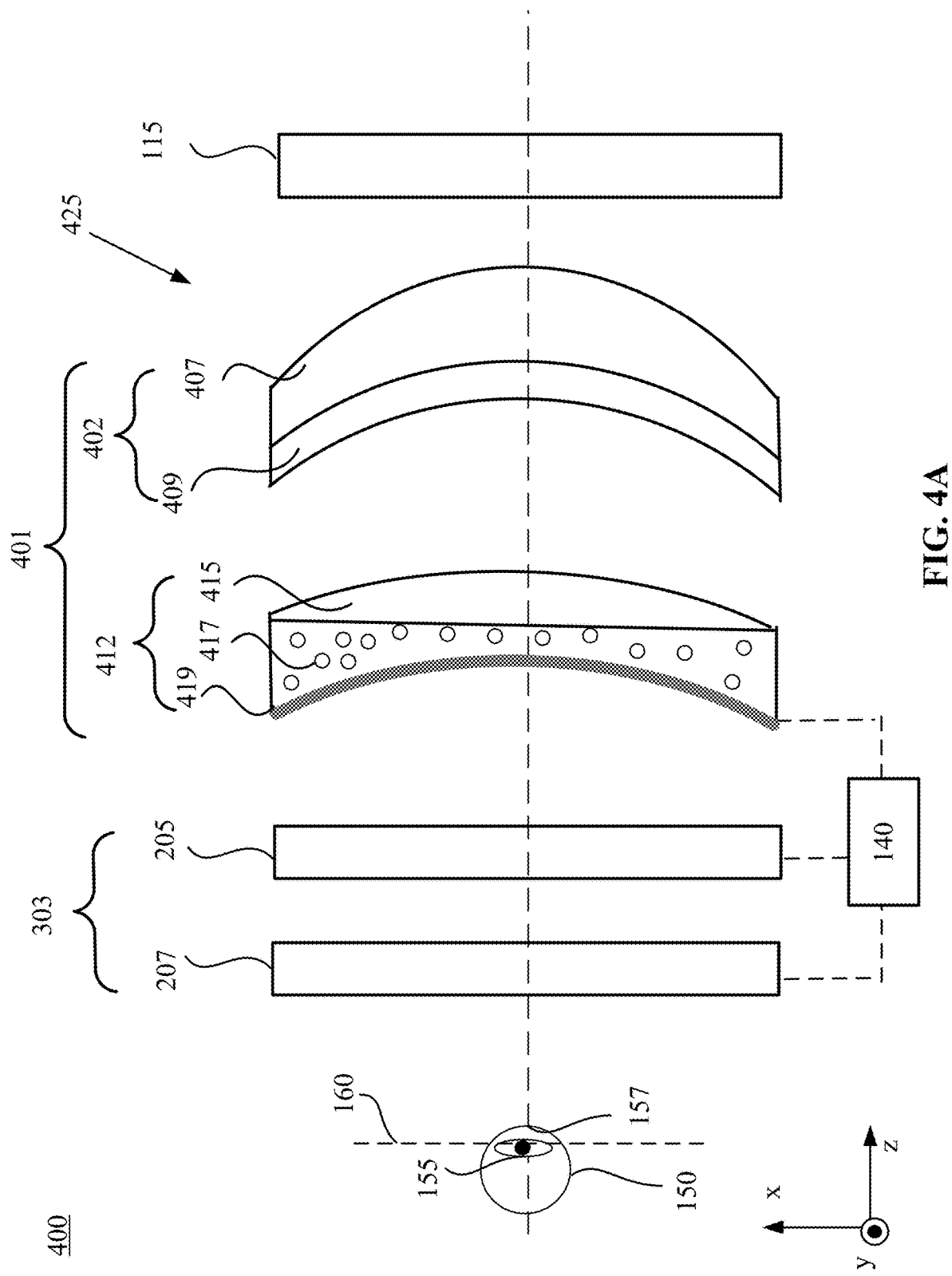
FIG. 4A schematically illustrates a diagram of a system including a varifocal device, according to an embodiment of the present disclosure.

FIG. 4A schematically illustrates a diagram of a system 400, according to an embodiment of the present disclosure. The system 400 may include elements, structures, and/or functions that are the same as or similar to those included in the system 200 shown in FIGS. 2A-2G, the system 250 shown in FIG. 2H, the system 280 shown in FIG. 2I, the system 290 shown in FIG. 2J, the system 300 shown in FIG. 3A, or the system 350 shown in FIG. 3C. Descriptions of the same or similar elements, structures, and/or functions can refer to the above descriptions rendered in connection with FIGS. 2A-2G, FIG. 2H, FIG. 2I, FIG. 2J, FIG. 3A, or FIG. 3C.

As shown in FIG. 4A, the system 400 may include the electronic display 115 and a varifocal device 425. The varifocal device 425 may be an embodiment of the varifocal device 125 shown in FIG. 1B. The varifocal device 425 may include a first lens assembly 401 and the second lens assembly 303 arranged in an optical series. The system 400 may also include the controller 140 that may be communicatively coupled with various elements in the first lens assembly 401 and the second lens assembly 303.

The second lens assembly 303 may include the polarization switch 205 and the PBP lens 207 arranged in an optical series. The polarization switch 205 may be disposed between the PBP lens 207 and the first lens assembly 401. The PBP lens 207 may be configured to provide an optical power that is variable within the first optical power adjustment range at the first step resolution (unit: Diopter).

In some embodiments, the second lens assembly 303 may include additional elements that are not shown in FIG. 4A. For example, the second lens assembly 303 may include an absorptive polarizer disposed between the PBP lens 207 and the eye 150. In the embodiment shown in FIG. 4A, the polarization switch 205 and the PBP lens 207 are shown as being spaced apart from one another by a gap. In some embodiments, the polarization switch 205 and the PBP lens 207 may be stacked without a gap (e.g., through direct contact). FIG. 4A shows the polarization switch 205 and the PBP lens 207 have flat surfaces for illustrative purposes. In some embodiments, one or more of the polarization switch 205 and the PBP lens 207 may have a curved surface.

In some embodiments, the first lens assembly 401 may be a folded (or path-folding) lens assembly with a variable optical power that is variable within the second optical power adjustment range at the second step resolution (unit: Diopter). In the disclosed embodiments, the second step resolution may be smaller than the first step resolution, e.g., smaller than or equal to 1/10 (or 1/20, 1/15, 1/5, or any other suitable fraction) of the first step resolution. In some embodiments, the second step resolution may be less than or equal to 0.05 Diopter, 0.06 Diopter, 0.07 Diopter, 0.08 Diopter, 0.09 Diopter, or 0.1 Diopter, etc., and the first step resolution may be greater than or equal to 0.5 Diopter, 0.6 Diopter, 0.7 Diopter, 0.8 Diopter, 0.9 Diopter, or 1.0 Diopter, etc. Thus, the varifocal device 425 may be configured to provide an enlarged optical power adjustment range in a reduced step resolution (e.g., the second step resolution). Accordingly, the varifocal device 425 may have an improved capability of mitigating the vergence accommodation conflict, and may provide an improved image quality at the eye-box region 160 of the system 400.

In some embodiments, the first lens assembly 401 may include a first optical component 402 and a second optical component 412 disposed apart from the first optical component 402 by a gap. The first optical component 402 may include a first optical lens 407 and a partial reflector 409. The first optical lens 407 may be made of a suitable optical material that is substantially transparent in the visible spectrum, e.g., glass, polymer, or resin, etc. In some embodiments, as shown in FIG. 4A, the first optical lens 407 may be configured with a fixed optical power. In some embodiments, one or more surfaces of the first optical lens 407 may be configured with a shape to correct a field curvature. For example, one or more surfaces of the first optical lens 407 may be configured with a spherically concave shape (e.g., a portion of a sphere), a spherically convex shape, a rotationally symmetric asphere shape, a freeform shape, or other shapes that may mitigate a field curvature. In some embodiments, the shape of one or more surfaces of the first optical lens 407 may be configured to additionally correct other forms of optical aberrations.

The partial reflector 409 may be disposed at a surface of the first optical lens 407 facing the second optical component 412. In some embodiments, the partial reflector 409 may be a layer or coating disposed at (e.g., bonded to or formed on) a surface of the first optical lens 407. The first optical lens 407 may be partially reflective and partially transmissive. In some embodiments, the first optical lens 407 may be configured to transmit about 50% and reflect about 50% of an input light, and hence may be referred to as a "50/50 mirror".

The second optical component 412 may include a second tunable optical lens (also referred to as 412 for discussion purposes) configured with a variable optical power that is variable in the second step resolution. In some embodiments, the second optical lens 412 may be a membrane liquid lens, e.g., similar to the tunable lens 209 shown in FIG. 2E. For example, the second optical lens 412 may include an optical fluid 417 encapsulated by a substate 415 and a deformable member (e.g., membrane) 419. For discussion purposes, the optical effect of the deformable member 419 for an input light may be negligible, and a physical interface between the optical fluid 417 and the outside environment (e.g., air) may be deemed as the deformable optical interface of the second optical lens 412. The optical power of the second optical lens 412 may vary with shape of the deformable member 419.

In some embodiments, as shown in FIG. 4A, the substate 415 may be disposed at a first side of the second optical lens 412 facing the first optical component 402, and the deformable member 419 may be disposed at a second side of the second optical lens 412 facing the eye-box region 160. In some embodiments, although not shown, the substate 415 may be disposed at the second side of the second optical lens 412 facing the eye-box region 160, and the deformable member 419 may be disposed at the first side of the second optical lens 412 facing the first optical component 402. The optical fluid 417 may have a refractive index greater than the refractive index of the outside environment (e.g., air). The optical fluid 417 and the substate 415 may be optically transparent.

The deformable member 419 may be configured to substantially reflect a polarized light having a predetermined polarization, and substantially transmit a polarized light having a polarization that is orthogonal to the predetermined polarization. The deformable member 419 may substantially maintain the polarization of the polarized light while transmitting or reflecting the polarized light. In other words, the deformable member 419 may function as a circular reflective polarizer, or a linear reflective polarizer. The deformable member 419 may be referred to as a deformable reflective polarizer 419.

In some embodiments, the second optical component 412 may include additional elements not shown in FIG. 4A, such as a polarizer, and/or a quarter-wave plate, etc. For example, in some embodiments, when the deformable member 419 functions as a linear reflective polarizer, a waveplate (e.g., a quarter-wave plate) may be disposed between the deformable member 419 and the second lens assembly 303 to covert a linearly polarized image light output from the deformable member 419 into a circularly polarized image light propagating toward the second lens assembly 303. In some embodiments, the waveplate (e.g., quarter-wave plate) may be a layer or coating disposed at (e.g., bonded to or formed on) a surface of the deformable member 419 facing the second lens assembly 303. In some embodiments, when the deformable member 419 is a circular reflective polarizer, the waveplate (e.g., quarter-wave plate) may be omitted.

In some embodiments, the second optical component 412 may also include a polarizer (not shown) disposed between the deformable member 419 and the second lens assembly 303. In some embodiments, the polarizer may be a layer or coating disposed at (e.g., bonded to or formed on) the surface of the deformable member 419 facing the second lens assembly 303. The polarizer may be an absorptive polarizer functioning as a "clean up" polarizer that removes an image light having an undesirable polarization via absorption.

In embodiments, the deformable member 419 may be coated with an optical coating configured to substantially reflect a polarized light having a predetermined polarization, and substantially transmit a polarized light having a polarization that is orthogonal to the predetermined polarization. In embodiments, the deformable member 419 may be made of a material that is configured to substantially reflect a polarized light having a predetermined polarization, and substantially transmit a polarized light having a polarization that is orthogonal to the predetermined polarization.

The deformable member 419 may be deformed by various mechanisms. For example, the deformable member 419 or a supporting member coupled with the deformable membrane 419 may be driven by an actuator, e.g., a mechanical actuator, a piezo actuator, or a voice coil actuator, etc., to move to deform the deformable member 419, thereby changing the optical power of the second optical component 412. For example, the actuator may be electrically coupled with the controller 140, and the controller 140 may control the output of the actuator to drive the deformable member 419 or the supporting member coupled with the deformable member 419 to control the shape of the deformable member 419, thereby controlling the optical power of the second optical lens 412. The second optical lens 412 may be referred to as a membrane liquid lens, or a liquid-filled lens. The second optical lens 412 may be a mechanical varifocal liquid lens, an edge actuator liquid lens, or an edge driven membrane liquid lens, etc.

In some embodiments, one or more surfaces of the second optical lens 412 (e.g., the deformable member 419 and/or the substate 415) may be configured with a shape to correct a field curvature. For example, one or more surfaces of the second optical lens 412 may be configured with a spherically concave shape (e.g., a portion of a sphere), a spherically convex shape, a rotationally symmetric asphere shape, a freeform shape, or other shapes that may mitigate a field curvature. In some embodiments, the shape of one or more surfaces of the second optical lens 412 may be configured to additionally correct other forms of optical aberrations. The substate 415 may be made of a suitable optical material that is substantially transparent in the visible spectrum, e.g., glass, polymer, or resin, etc. The optical path of an image light in the system 400 may be similar to that shown in FIG. 3B.

Figure 4B:
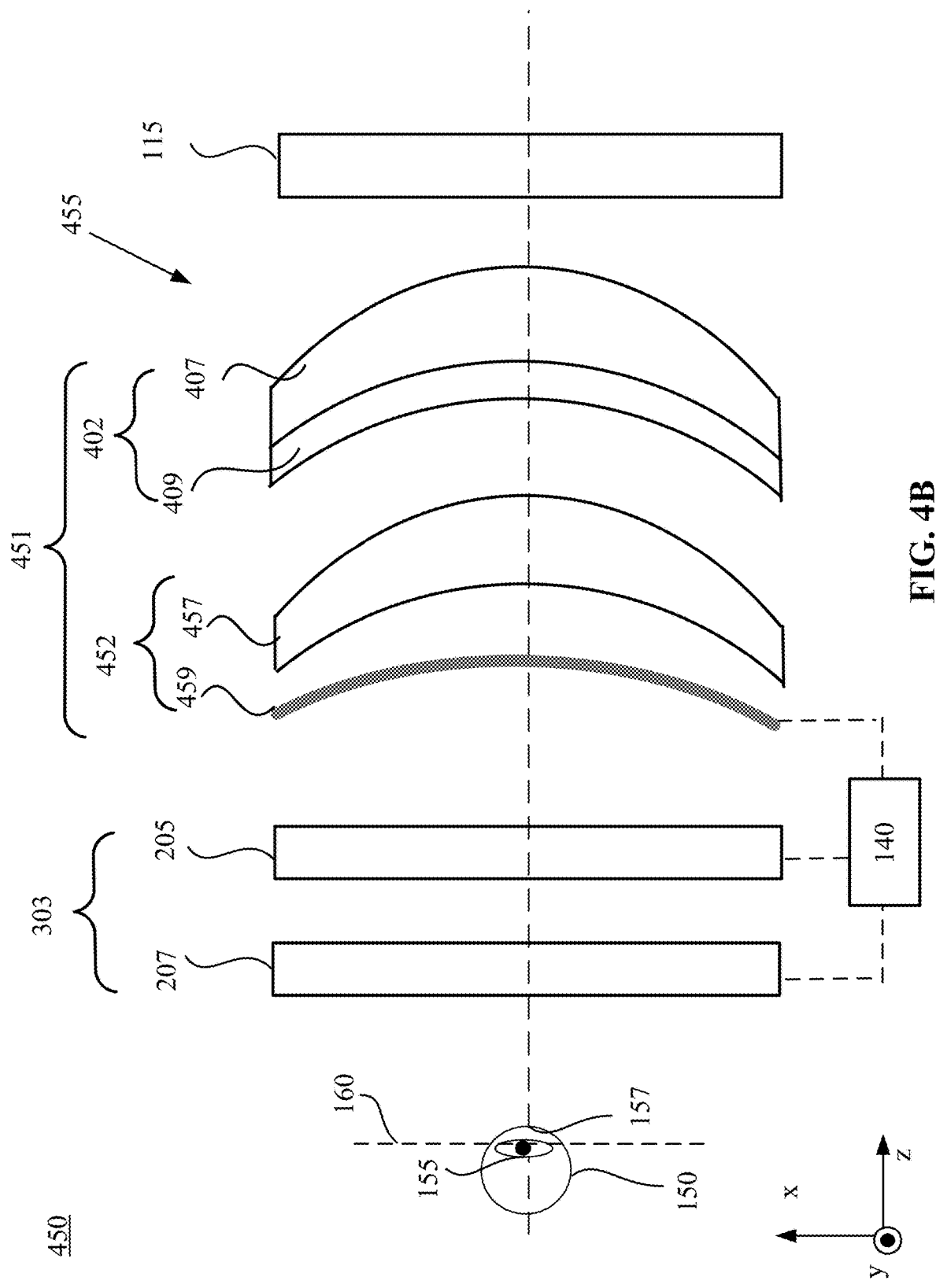
FIG. 4B schematically illustrates a diagram of a system including a varifocal device, according to an embodiment of the present disclosure.

FIG. 4B schematically illustrates a diagram of a system 450, according to an embodiment of the present disclosure. The system 450 may include elements, structures, and/or functions that are the same as or similar to those included in the system 200 shown in FIGS. 2A-2G, the system 250 shown in FIG. 2H, the system 280 shown in FIG. 2I, the system 290 shown in FIG. 2J, or the system 400 shown in FIG. 4A. Descriptions of the same or similar elements, structures, and/or functions can refer to the above descriptions rendered in connection with FIGS. 2A-2G, FIG. 2H, FIG. 2I, FIG. 2J, or FIG. 4A.

As shown in FIG. 4B, the system 450 may include the electronic display 115 and a varifocal device 455. The varifocal device 455 may be an embodiment of the varifocal device 125 shown in FIG. 1B. The varifocal device 455 may include a first lens assembly 451 and the second lens assembly 303 arranged in an optical series. The system 450 may also include the controller 140 that may be communicatively coupled with various elements in the first lens assembly 451 and the second lens assembly 303, and may control the operations of the various elements. The second lens assembly 303 may be configured to provide a variable optical power that is variable within the first optical power adjustment range at the first step resolution (unit: Diopter). The first lens assembly 451 may be a folded (or path-folding) lens assembly having a variable optical power that is variable within the second optical power adjustment range at the second step resolution (unit: Diopter). In the disclosed embodiments, the second step resolution may be configured to be smaller than the first step resolution, e.g., smaller than or equal to $1/10$ (or $1/20$, $1/15$, $1/5$, or any other suitable fraction) of the first step resolution. In some embodiments, the second step resolution may be less than or equal to 0.05 Diopter, 0.06 Diopter, 0.07 Diopter, 0.08 Diopter, 0.09 Diopter, or 0.1 Diopter, etc., and the first step resolution may be greater than or equal to 0.5 Diopter, 0.6 Diopter, 0.7 Diopter, 0.8 Diopter, 0.9 Diopter, or 1.0 Diopter, etc. Thus, the varifocal device 455 may be configured to provide an enlarged optical power adjustment range in a reduced step resolution (e.g., the second step resolution). Accordingly, the varifocal device 455 may have an improved capability of mitigating the vergence accommodation conflict, and may provide an improved image quality at the eye-box region 160 of the system 450.

The first lens assembly 451 may include the first optical component 402 and a second optical component 452 arranged in an optical series. The first optical component 402 may be disposed between the second optical component 452 and the display element 115. The second optical component 452 may include a second optical lens 457 and a deformable member (e.g., membrane) 459 disposed apart from one another by a gap. The second optical lens 457 may be made of a suitable optical material that is substantially transparent in the visible spectrum, e.g., glass, polymer, or resin, etc. In some embodiments, as shown in FIG. 4B, the second optical lens 457 may be configured with a fixed optical power. In some embodiments, one or more surfaces of the second optical lens 457 may be configured with a shape to correct a field curvature. For example, one or more surfaces of the second optical lens 457 may be configured with a spherically concave shape (e.g., a portion of a sphere), a spherically convex shape, a rotationally symmetric asphere shape, a freeform shape, or other shapes that may mitigate a field curvature. In some embodiments, the shape of one or more surfaces of the second optical lens 457 may be configured to additionally correct other forms of optical aberrations.

The deformable member 459 may be a tunable lens configured with a variable optical power that is variable in the second step resolution. The deformable member 459 may function as the deformable optical interface. The deformable member 459 may be configured to substantially reflect a polarized light having a predetermined polarization, and substantially transmit a polarized light having a polarization that is orthogonal to the predetermined polarization. The deformable member 459 may substantially maintain the polarization of the polarized light while transmitting or reflecting the polarized light. In other words, the deformable member 459 may function as a circular reflective polarizer, or a linear reflective polarizer, with a variable optical power. The deformable member 459 may also be referred to as a deformable reflective polarizer 459. In some embodiments, the deformable member 459 may be coated with an optical coating configured to substantially reflect a polarized light having a predetermined polarization, and substantially transmit a polarized light having a polarization that is orthogonal to the predetermined polarization. In embodiments, the deformable member 459 may be made of a material that is configured to substantially reflect a polarized light having a predetermined polarization, and substantially transmit a polarized light having a polarization that is orthogonal to the predetermined polarization.

In some embodiments, the deformable member 459 may be a free standing element spaced apart from the second optical lens 457, as shown in FIG. 4B. The deformable member 459 may be disposed at a side of the second optical lens 457 facing the second lens assembly 303, or a side of the second optical lens 457 facing the second optical component 452. In some embodiments, although not shown in FIG. 4B, periphery portions of the deformable member 459 may be coupled with corresponding periphery portions of the second optical lens 457, and a central portion of the deformable member 459 may be spaced apart from a corresponding central portion of the second optical lens 457, such that there is a space for accommodating the deformation of the deformable member 459. The deformable member 459 may be deformable by various mechanisms. For example, the deformable member 459 or a supporting member coupled with the deformable member 459 may be driven by an actuator, e.g., a mechanical actuator, a piezo actuator, or a voice coil actuator, etc., to move or to bend to change the shape of the deformable member 459, thereby changing the optical power provided by the first optical component 402. In some embodiments, the deformable member 459 may include a piezo membrane that is deformable by, e.g., applying a voltage. In some embodiments, the piezo membrane may be configured with a curvature at a non-activating state, e.g., a voltage-off state. The curvature at the non-activating state may be referred to as pre-curvature. As the applied voltage changes, the shape of the piezo membrane may change accordingly, which, in turn, changes the optical power provided by the piezo membrane. In In some embodiments, the optical power of the piezo membrane may be configured to vary between 0 Diopter and +1 Diopter, or between 0 Diopter and −1 Diopter.

In some embodiments, the second optical component 452 may include additional elements not shown in FIG. 4B. For example, the second optical component 452 may include a waveplate (e.g., a quarter-wave plate), a "clean up" polarizer, or a combination thereof, etc. The details of the waveplate (e.g., quarter-wave plate) and the "clean up" polarizer can refer to the above descriptions rendered in connection with FIG. 4A.

The elements in the varifocal devices and the features of the varifocal devices as described in various embodiments may be combined in any suitable manner. For example, in some embodiments, the second optical component 312 shown in FIG. 3A may be replaced by the second optical component 412 shown in FIG. 4A or the second optical component 452 shown in FIG. 4B. Thus, the first optical component 302 shown in FIG. 3A may be coupled to the second optical component 412 shown in FIG. 4A or the second optical component 452 shown in FIG. 4B to form the first lens assembly. In some embodiments, the second optical component 312 shown in FIG. 3C may be replaced by the second optical component 412 shown in FIG. 4A or the second optical component 452 shown in FIG. 4B. Thus, the first optical component 352 shown in FIG. 3C may be coupled to the second optical component 412 shown in FIG. 4A or the second optical component 452 shown in FIG. 4B to form the first lens assembly. In some embodiments, the first lens assembly 201 shown in FIG. 2A or FIG. 2H may be replaced by the first lens assembly 301 shown in FIG. 3A, the first lens assembly 351 shown in FIG. 3C, the first lens assembly 401 shown in FIG. 4A, the first lens assembly 451 shown in FIG. 4B, or a first lens assembly including combined elements included in the first lens assembly 301 shown in FIG. 3A, the first lens assembly 351 shown in FIG. 3C, the first lens assembly 401 shown in FIG. 4A, and/or the first lens assembly 451 shown in FIG. 4B.

In some embodiments, as shown in FIGS. 3A-4B, the stack of the PBP lens 207 and the polarization switch 205 may be disposed between the first lens assembly and the eye-box 160. In some embodiments, although not shown, the stack of the PBP lens 207 and the polarization switch 205 may be disposed between the first optical component and the second optical component of the first lens assembly. In some embodiments, although not shown, the stack of the PBP lens 207 and the polarization switch 205 may be disposed between the first lens assembly and the display element 115. In some embodiments, the stack of the PBP lens 207 and the polarization switch 205 may be replaced by a stack of a plurality of PBP lenses 207 and a plurality of polarization switches 205 alternately arranged. The respective polarization switches 205 may control the respective handednesses of respective circularly polarized input lights of the respective PBP lenses 207.

The folded lens assembly 301, 351, 401, and 451 shown in FIGS. 3A-4B are used as example structures in illustrating and explaining the operation principles of using a deformable mirror and/or a deformable reflective polarizer to render a varifocal folded lens assembly to provide a continuous optical power adjustment in, e.g., the second step resolution. The operation principles may be applicable to any suitable folded lens assembly other than the disclosed folded lens assembly 301, 351, 401, and 451 shown in FIG. 3A-4B, such as a pancake lens assembly, or a double pancake lens assembly, etc.

The PBP lens 207 is used as an example of a polarization selective, transmissive lens configured to provide a variable optical power in the first step resolution. In some embodiments, another suitable polarization selective, transmissive lens that could provide a variable optical power in the first step resolution may also be used in the disclosed varifocal device, following the same or similar design principles described herein with respect to the PBP lens 207. The PBP lens 207 is used as an example of a polarization selective, transmissive lens configured to provide a variable optical power in the first step resolution. In some embodiments, another suitable polarization selective, transmissive lens that could provide a variable optical power in the first step resolution may also be used in the disclosed varifocal device, following the same or similar design principles described herein with respect to the PBP lens 207.

FIGS. 5A-5D illustrate a PBP lens 500, according to an embodiment of the present disclosure. The PBP lens 500 may be an embodiment of the PBP lens 207 included in the varifocal devices as described in various embodiments. In some embodiments, the PBP lens 500 may include a birefringent film 505. An optic axis of the birefringent film 505 may be configured with an in-plane orientation pattern, in which the orientation of the optic axis may continuously vary in at least two opposite in-plane directions (e.g., a plurality of opposite radial directions) from a center of the in-plane orientation pattern to two opposite peripheries of the in-plane orientation pattern with a varying pitch (e.g., decreasing from center to peripheries). In some embodiments, the birefringent film 505 may include optical anisotropic molecules 512.

Figure 5A:
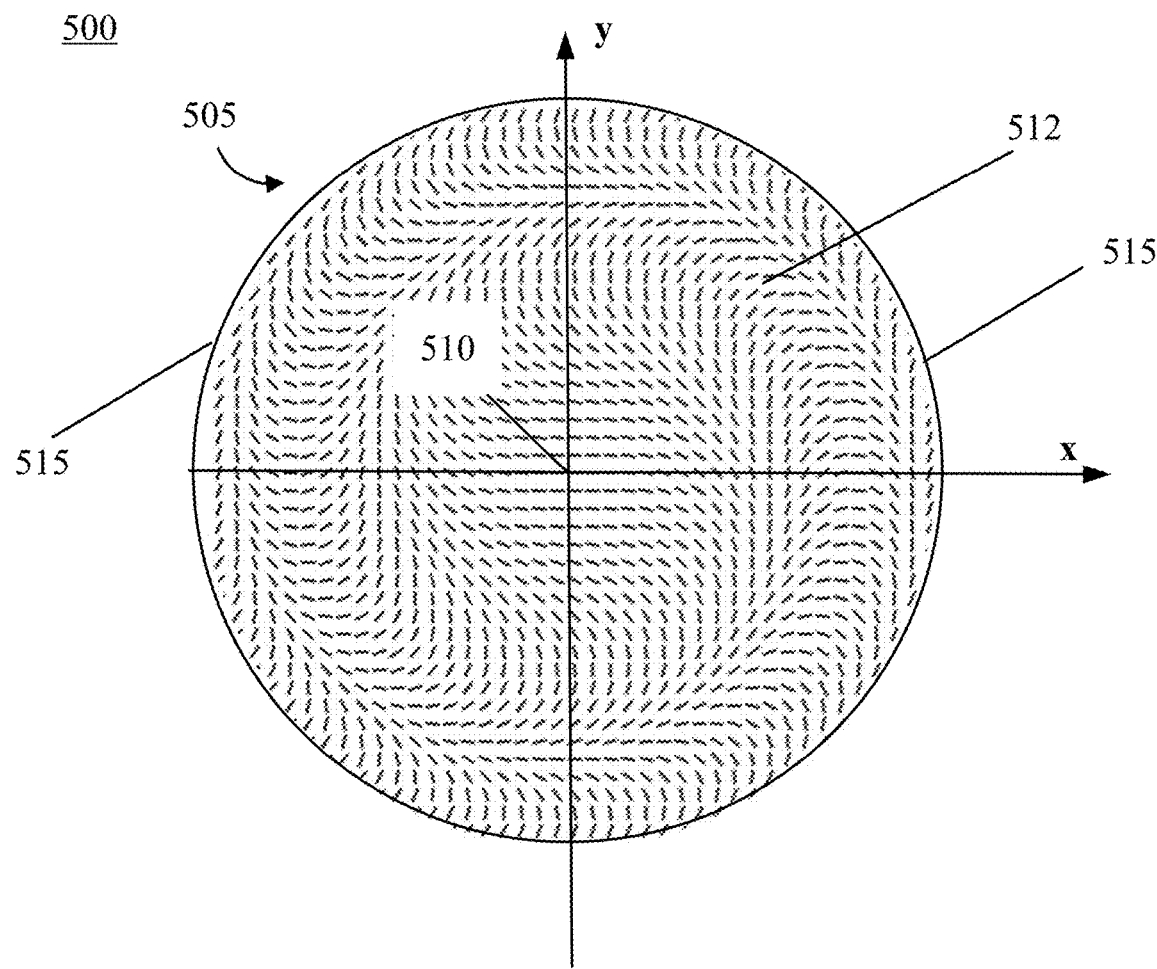
FIGS. 5A and 5B schematically illustrate in-plane orientations of optically anisotropic molecules included in a Pancharatnam Berry Phase ("PBP") lens, according to an embodiment of the present disclosure.
Figure 5B:
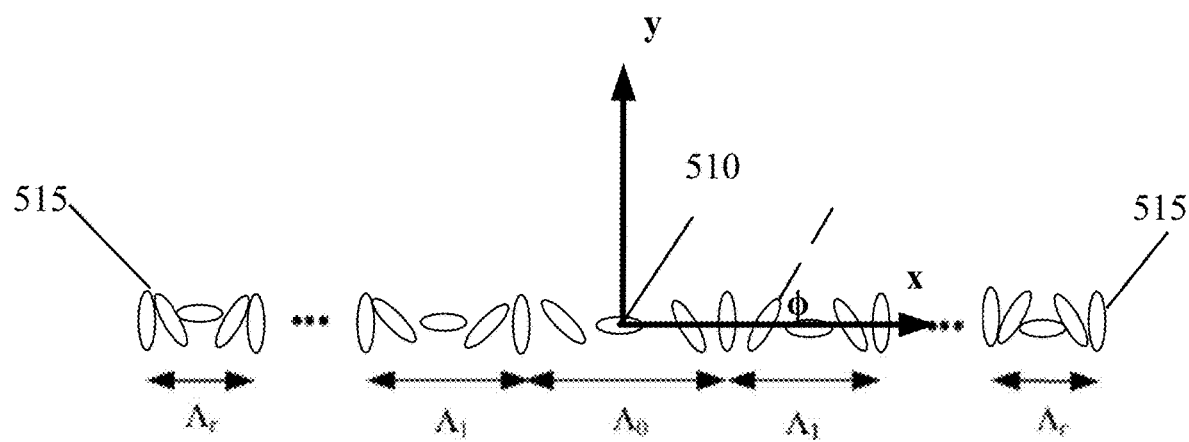

FIG. 5A schematically illustrates an x-y sectional view of an in-plane orientation pattern of optical anisotropic molecules 512 in the birefringent film 505 of the PBP lens 500, according to an embodiment of the present disclosure. FIG. 5B illustrates a section of the in-plane orientation pattern taken along an x-axis in the birefringent film 505 of the PBP lens 500 shown in FIG. 5A, according to an embodiment of the present disclosure. For discussion purposes, in FIGS. 5A and 5B, the birefringent film 505 may include an LC material, and rod-like LC molecules 512 are used as examples of the optically anisotropic molecules 512 of the birefringent film 505. The rod-like LC molecule 512 may have a longitudinal direction (or a length direction) and a lateral direction (or a width direction). The longitudinal direction of the LC molecule 512 may be referred to as a director of the LC molecule 512 or an LC director. An orientation of the LC director may determine a local optic axis orientation or an orientation of the optic axis at a local point of the birefringent film 505. The term "optic axis" may refer to a direction in a crystal. A light propagating in the optic axis direction may not experience birefringence (or double refraction). An optic axis may be a direction rather than a single line: lights propagating in directions parallel to that direction may experience no birefringence. The local optic axis may refer to an optic axis within a predetermined region of a crystal.

As shown in FIG. 5A, the LC molecules 512 located at a film plane of the birefringent film 505 may be configured with an in-plane orientation pattern having a varying pitch in at least two opposite in-plane directions (e.g., a plurality of radial directions) from a lens center 510 to opposite lens peripheries 515. The orientations of LC directors of LC molecules 512 at the film plane may exhibit a continuously rotation in at least two opposite in-plane directions from the lens center 510 to the opposite lens peripheries 515 with a varying pitch Λ. The orientations of the LC directors may exhibit a rotation in a same rotation direction (e.g., clockwise, or counter-clockwise) from the lens center 510 to the opposite lens peripheries 515. A pitch Λ of the in-plane orientation pattern may be defined as a distance in the in-plane direction (e.g., a radial direction) over which the orientation of the LC director (or an azimuthal angle ϕ of the LC molecule 512) changes by a predetermined angle (e.g., 180°) from a predetermined initial state. The pitch Λ of the in-plane orientation pattern may also be referred to as an in-plane pitch of the in-plane orientation pattern. As shown in FIG. 5B, according to the LC director field along the x-axis direction, the pitch Λ may be a function of the distance from the lens center 510. The pitch Λ may monotonically decrease from the lens center 510 to the lens peripheries 515 in the at least two opposite in-plane directions (e.g., a plurality of opposite radial directions) in the x-y plane, e.g., $\Lambda_0 > \Lambda_1 > \ldots > \Lambda_r$. $\Lambda_0$ is the pitch at a central region of the PBP lens 500, which may be the largest. The pitch $\Lambda_r$ is the pitch at an edge region (e.g., periphery 515) of the PBP lens 500, which may be the smallest. In some embodiments, the azimuthal angle ϕ of the LC molecule 512 may change in proportional to the distance from the lens center 510 to a local point of the birefringent film 505 at which the LC molecule 512 is located. For example, the azimuthal angle ϕ of the LC molecule 512 may change according to an equation of $$\phi = \frac{\pi r^2}{2f\lambda},$$

where ϕ is the azimuthal angle of the LC molecule 512 at a local point of the birefringent film 505, r is a distance from the lens center 510 to the local point in the lens plane, f is a focal distance of the PBP lens 500, and λ is a designed operation wavelength of the PBP lens 500. In some embodiments, in a volume of the birefringent film 505, along the thickness direction (e.g., the z-axis direction) of the birefringent film 505, the LC directors (or the azimuth angles ϕ) of the LC molecules 512 may remain in the same orientation (or value) from the first surface to the second surface of the birefringent film 505. In some embodiments, a twist structure may be introduced along the thickness direction of the birefringent film 505 and may be compensated for by its mirror twist structure, which may enable the PBP lens 500 to have an achromatic performance.

Figure 5D:
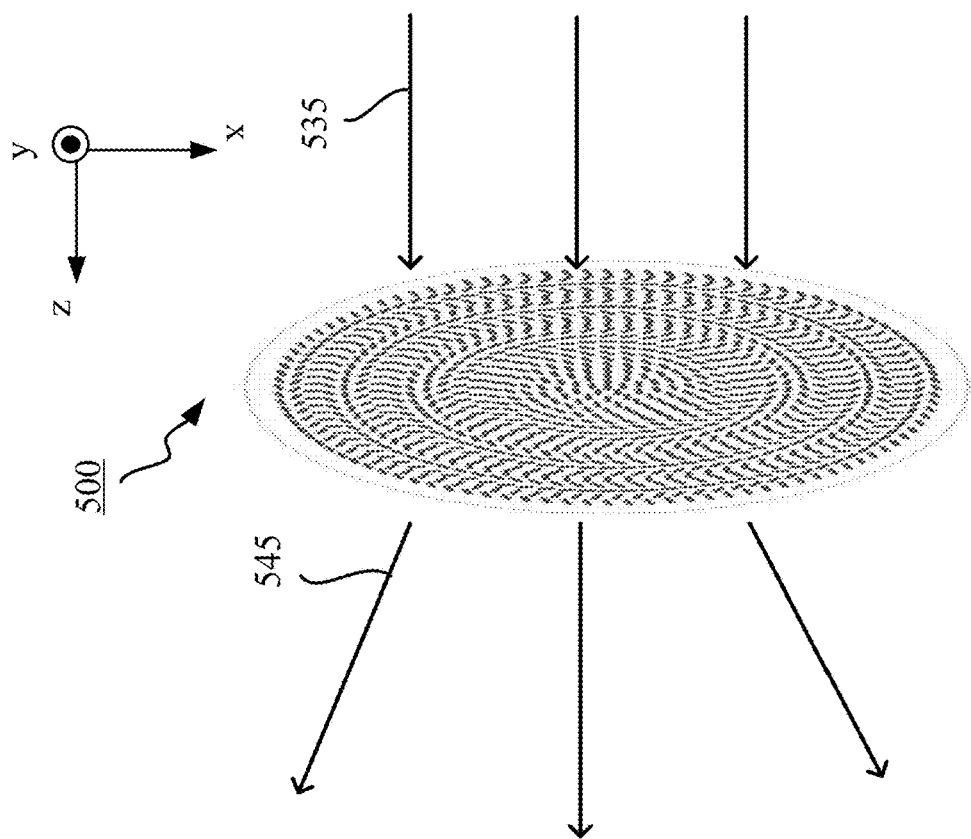
FIGS. 5C and 5D schematically illustrate polarization selective converging and diverging of lights by the PBP lens shown in FIGS. 5A and 5B, according to an embodiment of the present disclosure.
Figure 5C:
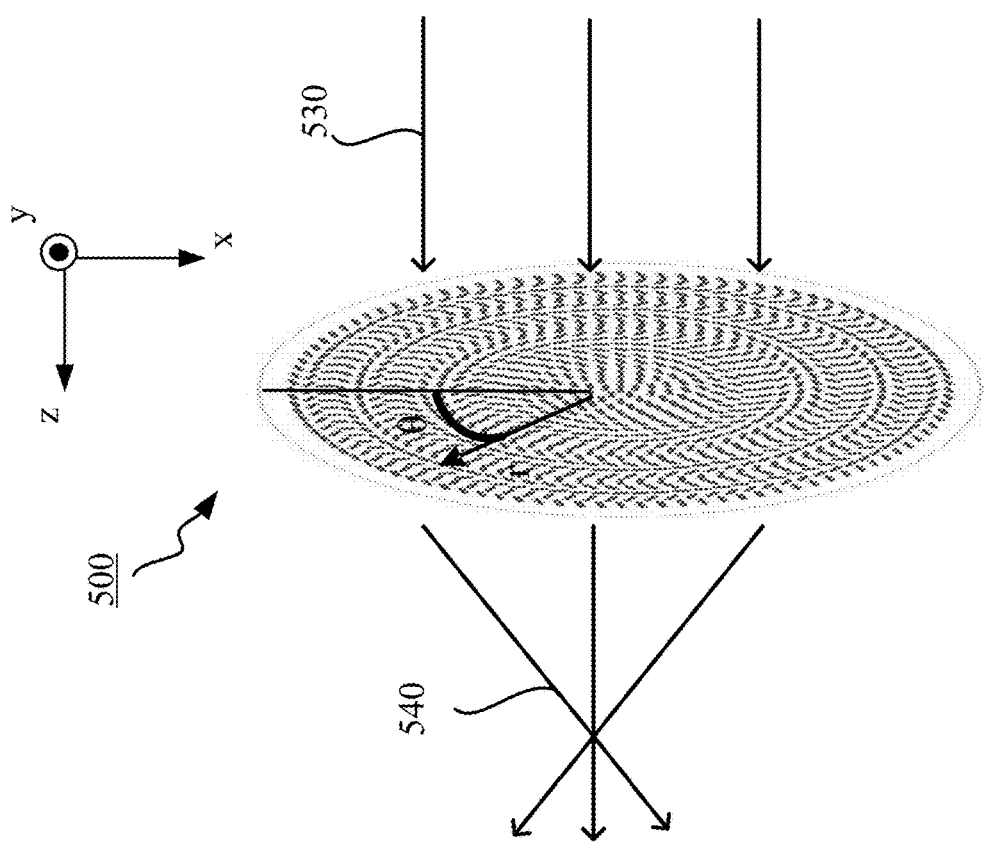

FIGS. 5C and 5D illustrate polarization selective focusing/defocusing of the PBP lens 500, according to an embodiment of the present disclosure. The PBP lens 500 may be a passive PBP lens or an active PBP lens. A passive PBP lens may have, or may be configurable to operate in two optical states for a circularly polarized input light having a wavelength in a predetermined wavelength range of the PBP lens, e.g., a focusing (or converging) state and a defocusing (or diverging) state. The optical state of the passive PBP lens may depend on the handedness of the circularly polarized input light, and the rotation direction of the LC directors in the at least two opposite in-plane directions from the lens center 510 to the opposite lens peripheries 515. In some embodiments, the passive PBP lens may operate in the focusing state for a circularly polarized input light having a handedness that is the same as the rotation direction of the LC directors in the at least two opposite in-plane directions from the lens center 510 to the opposite lens peripheries 515, and operate in the defocusing state for a circularly polarized input light having a handedness that is opposite to the rotation direction of the LC directors in the at least two opposite in-plane directions from the lens center 510 to the opposite lens peripheries 515. In addition, the passive PBP lens may reverse the handedness of a circularly polarized light transmitted therethrough in addition to focusing/defocusing the circularly polarized light.

An active PBP lens may have, or may be configurable to operate in three optical states for a circularly polarized input light having a wavelength in a predetermined (or operation) wavelength range of the PBP lens, e.g., a focusing (or converging) state, a defocusing (or diverging) state, and a neutral state. The optical state of the active PBP lens may depend on the handedness of the circularly polarized input light, the rotation direction of the LC directors in the at least two opposite in-plane directions from the lens center 510 to the opposite lens peripheries 515, and a voltage applied to the active PBP lens. The active PBP lens operating in the focusing state or the defocusing state may function similarly to the passive PBP lens. The active PBP lens operating in the neutral state may provide a substantially zero optical power to the circularly polarized input light, independent of the handedness thereof. The active PBP lens operating in the focusing state or the defocusing state may reverse the handedness of a circularly polarized light transmitted therethrough in addition to focusing/defocusing the circularly polarized light. The active PBP lens operating in the neutral state may maintain or reverse the handedness of a circularly polarized light transmitted therethrough.

For example, as shown in FIG. 5C, the PBP lens 500 may operate in the focusing state (or the converging state) for a right-handed circularly polarized ("RHCP") light 530 having a wavelength in a predetermined wavelength range associated with the PBP lens 500. The PBP lens 500 may focus the RHCP light 530 as an LHCP light 540. As shown in FIG. 5D, the PBP lens 500 may operate in the defocusing state (or the diverging state) for a left-handed circularly polarized ("LHCP") light 535 having a wavelength in the predetermined wavelength range. The PBP lens 500 may defocus the LHCP light 535 as an RHCP light 545. In some embodiments, the PBP lens 500 may be indirectly switchable between the focusing (or converging) state and the defocusing (or diverging), through switching the handedness of the circularly polarized input light via an external polarization switch, e.g., the polarization switch 205 shown in FIG. 2B.

The PBP lens 500 based on LCs shown in FIGS. 5A-3D is for illustrative purposes. In some embodiments, the PBP lens may be based on sub-wavelength structures, a birefringent material (e.g., LCs), a photo-refractive holographic material, or any combination thereof.

In some embodiments, the present disclosure provides a device. The device includes a first lens configured to provide a first optical power that is variable within a first optical power adjustment range at a first step resolution. The device also includes a second lens coupled with the first lens and including a deformable member that is deformable to vary an optical power of the second lens. The second lens is configured to provide a second optical power that is variable within a second optical power adjustment range at a second step resolution, the second step resolution being smaller than the first step resolution.

In some embodiments, the first lens is a polarization selective, transmissive lens. In some embodiments, the first lens is a Pancharatnam Berry Phase ("PBP") lens. In some embodiments, the second step resolution is smaller than or equal to $\frac{1}{10}$ of the first step resolution.

In some embodiments, the first step resolution is greater than or equal to 0.5 Diopter, 0.6 Diopter, 0.7 Diopter, 0.8 Diopter, 0.9 Diopter, or 1.0 Diopter, and the second step resolution is less than or equal to 0.05 Diopter, 0.06 Diopter, 0.07 Diopter, 0.08 Diopter, 0.09 Diopter, or 0.1 Diopter. In some embodiments, the second optical power adjustment range is greater than or equal to the first step resolution.

In some embodiments, the device also includes a polarization switch configured to control a polarization of an input light of the first lens, wherein the first lens is disposed between the polarization switch and the second lens. In some embodiments, the device also includes a polarization switch disposed between the first lens and the second lens, and configured to control a polarization of an input light of the first lens.

In some embodiments, the second lens includes a substrate that forms a chamber with the deformable member, and an optical fluid is encapsulated within the chamber. In some embodiments, the first lens is disposed at a surface of the deformable member or the substrate of the second lens. In some embodiments, the deformable member is a piezo membrane. In some embodiments, the first lens is disposed at a surface of the piezo membrane.

In some embodiments, the device also includes a reflective polarizer disposed between the first lens and the second lens. The deformable member is configured to reflect a first portion of a first light incident onto the second lens and transmit a second portion of the first light toward the reflective polarizer. The reflective polarizer is configured to reflect the second portion of the first light received from the deformable member back to the deformable member as a second light.

In some embodiments, the deformable member is configured to reflect a portion of the second light received from the reflective polarizer back to the reflective polarizer as a third light. In some embodiments, the reflective polarizer is configured to transmit the third light received from the deformable member as a fourth light toward the first lens. In some embodiments, the device also includes a polarization switch disposed between the reflective polarizer and the first lens, and configured to control a polarization of an input light of the first lens.

In some embodiments, the device also includes a partial reflector configured to reflect a first portion of a first light incident onto the partial reflector and transmit a second portion of the first light toward the second lens. The second lens is disposed between the partial reflector and the first lens, and the deformable member is configured to reflect the second portion of the first light received from the partial reflector back to the partial reflector as a second light.

In some embodiments, the partial reflector is configured to reflect a portion of the second light received from the deformable member back to the deformable member as a third light, and the deformable member is configured to transmit the third light received from the partial reflector as a fourth light toward the first lens. In some embodiments, the second lens includes a substrate forming a chamber with the deformable member, and an optical fluid is encapsulated within the chamber. In some embodiments, the deformable member is a piezo membrane. In some embodiments, the device also includes a polarization switch disposed between the second lens and the first lens, and configured to control a polarization of an input light of the first lens.

The foregoing description of the embodiments of the present disclosure have been presented for the purpose of illustration. It is not intended to be exhaustive or to limit the disclosure to the precise forms disclosed. Persons skilled in the relevant art can appreciate that modifications and variations are possible in beam of the above disclosure.

Some portions of this description may describe the embodiments of the present disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
   a first lens configured to provide a first optical power that is variable within a first optical power adjustment range at a first step resolution; and
   a second lens coupled with the first lens and including a deformable member that is deformable to vary an optical power of the second lens,
   a reflective polarizer disposed between the first lens and the second lens,
   wherein the second lens is configured to provide a second optical power that is variable within a second optical power adjustment range at a second step resolution, the second step resolution being smaller than the first step resolution,
   wherein the deformable member is configured to reflect a first portion of a first light incident onto the second lens and transmit a second portion of the first light toward the reflective polarizer, and wherein the reflective polarizer is configured to reflect the second portion of the first light received from the deformable member back to the deformable member as a second light.

2. The device of claim 1, wherein the first lens is a polarization selective, transmissive lens.

3. The device of claim 1, wherein the first lens is a Pancharatnam Berry Phase ("PBP") lens.

4. The device of claim 1, wherein the second step resolution is smaller than or equal to 1/10 of the first step resolution.

5. The device of claim 1, wherein
the first step resolution is greater than or equal to 0.5 Diopter, 0.6 Diopter, 0.7 Diopter, 0.8 Diopter, 0.9 Diopter, or 1.0 Diopter, and
the second step resolution is less than or equal to 0.05 Diopter, 0.06 Diopter, 0.07 Diopter, 0.08 Diopter, 0.09 Diopter, or 0.1 Diopter.

6. The device of claim 1, wherein the second optical power adjustment range is greater than or equal to the first step resolution.

7. The device of claim 1, further comprising a polarization switch configured to control a polarization of an input light of the first lens, wherein the first lens is disposed between the polarization switch and the second lens.

8. The device of claim 1, further comprising a polarization switch disposed between the first lens and the second lens, and configured to control a polarization of an input light of the first lens.

9. The device of claim 1, wherein the second lens includes a substrate that forms a chamber with the deformable member, and an optical fluid that is encapsulated within the chamber.

10. The device of claim 9, wherein the first lens is disposed at a surface of the deformable member or the substrate of the second lens.

11. The device of claim 1, wherein the deformable member is a piezo membrane.

12. The device of claim 11, wherein the first lens is disposed at a surface of the piezo membrane.

13. The device of claim 1, wherein:
the deformable member is configured to reflect a portion of the second light received from the reflective polarizer back to the reflective polarizer as a third light, and
the reflective polarizer is configured to transmit the third light received from the deformable member as a fourth light toward the first lens.

14. The device of claim 1, further comprising a polarization switch disposed between the reflective polarizer and the first lens, and configured to control a polarization of an input light of the first lens.

15. A device, comprising:
a first lens configured to provide a first optical power that is variable within a first optical power adjustment range at a first step resolution;
a second lens coupled with the first lens and including a deformable member that is deformable to vary an optical power of the second lens; and
a partial reflector configured to reflect a first portion of a first light incident onto the partial reflector and transmit a second portion of the first light toward the second lens,
wherein the second lens is configured to provide a second optical power that is variable within a second optical power adjustment range at a second step resolution, the second step resolution being smaller than the first step resolution, and
wherein the second lens is disposed between the partial reflector and the first lens, and the deformable member is configured to reflect the second portion of the first light received from the partial reflector back to the partial reflector as a second light.

16. The device of claim 15, wherein:
the partial reflector is configured to reflect a portion of the second light received from the deformable member back to the deformable member as a third light, and
the deformable member is configured to transmit the third light received from the partial reflector as a fourth light toward the first lens.

17. The device of claim 15, wherein the second lens includes a substrate forming a chamber with the deformable member, and an optical fluid is encapsulated within the chamber.

18. The device of claim 15, wherein the deformable member is a piezo membrane.

19. The device of claim 15, further comprising a polarization switch disposed between the second lens and the first lens, and configured to control a polarization of an input light of the first lens.

* * * * *